(12) United States Patent
Clark et al.

(10) Patent No.: US 11,741,659 B2
(45) Date of Patent: Aug. 29, 2023

(54) INTERSECTION TESTING IN A RAY TRACING SYSTEM USING THREE-DIMENSIONAL AXIS-ALIGNED BOX

(71) Applicant: Imagination Technologies Limited, Kings Langley (GB)

(72) Inventors: Gregory Clark, Hertfordshire (GB); Simon Fenney, Hertfordshire (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

(21) Appl. No.: 17/701,575

(22) Filed: Mar. 22, 2022

(65) Prior Publication Data

US 2022/0335678 A1 Oct. 20, 2022

(30) Foreign Application Priority Data

Mar. 23, 2021 (GB) ..................................... 2104055

(51) Int. Cl.
*G06T 15/06* (2011.01)
*G06T 15/00* (2011.01)

(52) U.S. Cl.
CPC ............ *G06T 15/06* (2013.01); *G06T 15/005* (2013.01); *G06T 2210/21* (2013.01)

(58) Field of Classification Search
CPC ... G06T 15/06; G06T 15/005; G06T 2210/21; G06T 2210/12; G06T 7/62
See application file for complete search history.

(56) References Cited

U.S. PATENT DOCUMENTS 8,564,589 B1 10/2013 Aila et al.
2007/0097118 A1* 5/2007 Reshetov ................ G06T 15/30
345/421
(Continued)

FOREIGN PATENT DOCUMENTS

CN 107111890 A 8/2017
CN 108090947 A 5/2018
(Continued)

OTHER PUBLICATIONS

Mahovsky et al; "Fast Ray-Axis Aligned Bounding Box Overlap Tests with Plucker Coordinates"; vol. 9: No. 1; pp. 35-46 (Year: 2004).*

(Continued)

*Primary Examiner* — Michael Le
(74) *Attorney, Agent, or Firm* — Potomac Law Group, PLLC; Vincent M DeLuca

(57) ABSTRACT

Determining whether a ray intersects a 3D axis-aligned box identifies the front-facing plane of the box which intersects the ray at a position furthest along a direction of the ray. Whether the ray intersects the box is determined by whether the ray intersects the identified front-facing plane at a position that is no further along the ray than positions at which the ray intersects the back-facing planes in a subset of the dimensions. The subset of dimensions comprises the two dimensions for which the front-facing plane was not identified, but does not comprise the dimension for which the front-facing plane was identified. Whether the ray intersects the box is determined without performing a test to determine whether the ray intersects the identified front-facing plane at a position that is no further along the ray than a position at which the ray intersects the back-facing plane in the front-facing plane dimension.

20 Claims, 8 Drawing Sheets

(56) References Cited

U.S. PATENT DOCUMENTS

| | | | | |
|---|---|---|---|---|
| 2008/0043018 A1* | 2/2008 | Keller | | G06T 15/55 |
| | | | | 345/426 |
| 2015/0379756 A1* | 12/2015 | Shin | | G06T 15/06 |
| | | | | 345/426 |
| 2016/0071313 A1* | 3/2016 | Laine | | G06T 15/08 |
| | | | | 345/419 |
| 2018/0182158 A1* | 6/2018 | Karras | | G06T 15/06 |
| 2018/0302614 A1* | 10/2018 | Toksvig | | H04N 17/002 |
| 2021/0287421 A1* | 9/2021 | Saleh | | G06T 17/10 |

FOREIGN PATENT DOCUMENTS

| | | |
|---|---|---|
| CN | 110930497 A | 3/2020 |
| GB | 2584187 A | 11/2020 |

OTHER PUBLICATIONS

"Ray tracing primitives"; https://www.cl.cam.ac.uk/teaching/1999/AGraphHCI/SMAG/node2.html#SECTION00023100000000000000.

Havel et al; "Yet Faster Ray-Triangle Intersection (Using SSE4)"; IEEE Transactions On Visualization and Computer Graphics; vol. 16; No. 3; May/Jun. 2010; pp. 434-438.

Kensler et al; "Optimizing Ray-Triangle Intersection via Automated Search"; School of Computing; University of Utah; pp. 1-6.

Mahovsky et al; "Fast Ray-Axis Aligned Bounding Box Overlap Tests with Plucker Coordinates"; vol. 9; No. 1; pp. 35-46.

Möller et al; "Fast, Minimum Storage Ray/Triangle Intersection"; pp. 1-7.

Shevtsov et al; "Ray-Triangle Intersection Algorithm for Modem CPU Architectures"; Russia, Moscow, Jun. 23-27, 2007; pp. 1-7.

Smits; "Efficiency Issues for Ray Tracing"; University of Utah; Feb. 19, 1999; pp. 1-12.

Toth; "On Ray Tracing Parametric Surfaces"; Computer Graphics Development; Ford Motor Company; vol. 19; No. 3; 1985; San Francisco Jul. 22-26; pp. 171-179.

Woop et al; "Watertight Ray/Triangle Intersection"; Journal of Computer Graphics Techniques; vol. 2; No. 1; 2013; pp. 65-82.

Kay et al; "Ray Tracing Complex Scenes"; ACM Siggraph 86, Computer Graphics; vol. 20; No. 4; Aug. 1986; pp. 269-278.

Williams et al; "An efficient and robust ray-box intersection algorithm"; Courses on ACM Siggraph; vol. 10; No. 1; Jul. 2005; pp. 55-60.

* cited by examiner

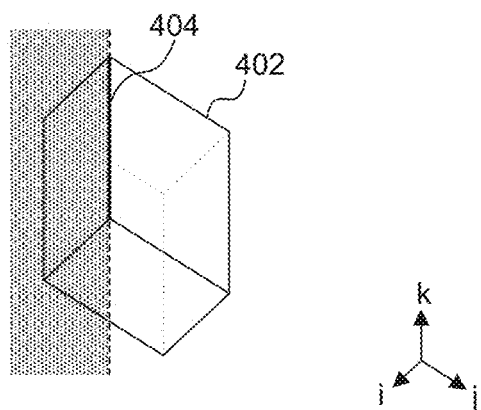
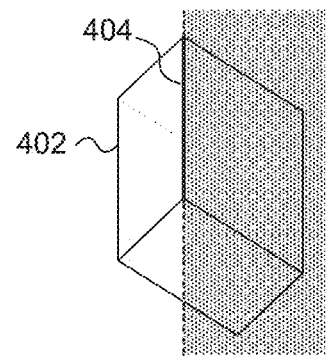
FIGURE 4a  FIGURE 4b
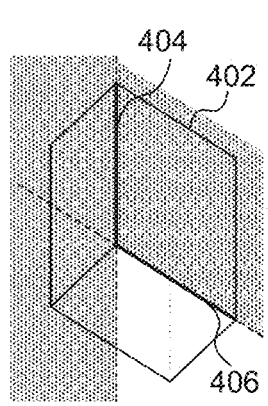 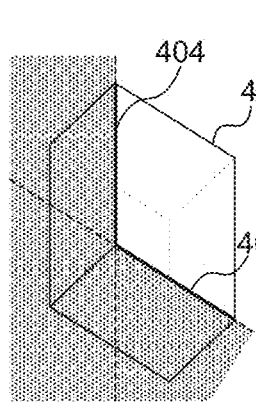 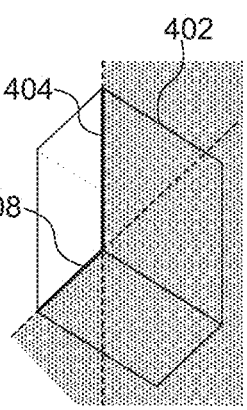 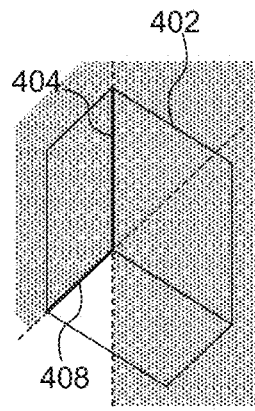
FIGURE 4c  FIGURE 4d  FIGURE 4e  FIGURE 4f
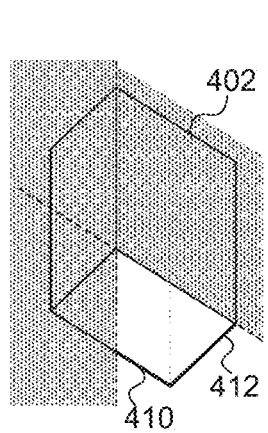 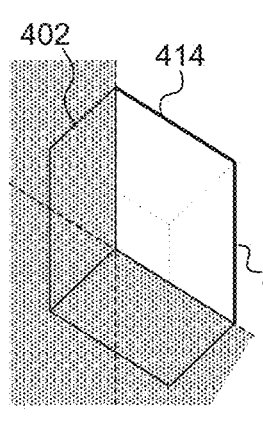 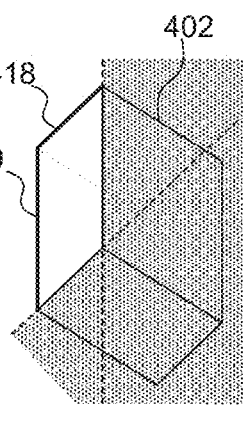 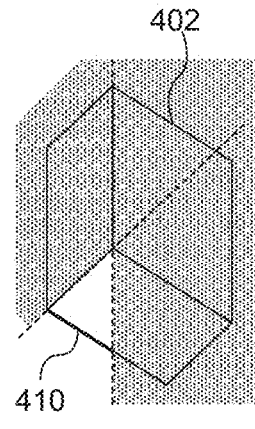
FIGURE 4g  FIGURE 4h  FIGURE 4i  FIGURE 4j

INTERSECTION TESTING IN A RAY TRACING SYSTEM USING THREE-DIMENSIONAL AXIS-ALIGNED BOX

FIELD

The present disclosure is directed to techniques of performing intersection testing in a ray tracing system.

BACKGROUND

Ray tracing is a computational rendering technique for generating an image of a scene (e.g. a 3D scene) by tracing paths of light ('rays') usually from the viewpoint of a camera through the scene. Each ray is modelled as originating from the camera and passing through a pixel into the scene. As a ray traverses the scene it may intersect objects within the scene. The interaction between a ray and an object it intersects can be modelled to create realistic visual effects. For example, in response to determining an intersection of a ray with an object, a shader program (i.e. a portion of computer code) may be executed in respect of the intersection. A programmer can write the shader program to define how the system reacts to the intersection which may, for example cause one or more secondary rays to be emitted into the scene, e.g. to represent a reflection of the ray off the intersected object or a refraction of the ray through the object (e.g. if the object is transparent or translucent). As another example, the shader program could cause one or more rays to be emitted into the scene for the purposes of determining whether the object is in shadow at the intersection point. The result of executing the shader program (and processing the relevant secondary rays) can be the calculation of a colour value for the pixel the ray passed through.

Rendering an image of a scene using ray tracing may involve performing many intersection tests, e.g. billions of intersection tests for rendering an image of a scene. In order to reduce the number of intersection tests that need to be performed, ray tracing systems can generate acceleration structures, wherein each node of an acceleration structure represents a region within the scene. Acceleration structures are often hierarchical (e.g. having a tree structure) such that they include multiple levels of nodes, wherein nodes near the top of the acceleration structure represent relatively large regions in the scene (e.g. the root node may represent the whole scene), and nodes near the bottom of the acceleration structure represent relatively small regions in the scene. A "tree node" refers to a node which has pointers to other nodes in the hierarchical acceleration structure, i.e. a tree node has child nodes in the hierarchical acceleration structure. A "leaf node" refers to a node which has one or more pointers to one or more primitives, i.e. a leaf node does not have child nodes in the hierarchical acceleration structure. In other words, leaf nodes of the acceleration structure represent regions bounding one or more primitives in the scene. The acceleration structure can have different structures in different examples, e.g. a grid structure, an octree structure, a space partitioning structure (e.g. a k-d tree) or a bounding volume hierarchy. The nodes can represent suitable shapes or regions in the scene (which may be referred to herein as "boxes"). In some examples the nodes represent axis-aligned bounding boxes (AABBs) in the scene.

Intersection testing can be performed for a ray (e.g. in a recursive manner) using the acceleration structure by first testing the ray for intersection with the root node of the acceleration structure. If the ray is found to intersect a parent node (e.g. the root node), testing can then proceed to the child nodes of that parent. In contrast, if the ray is found not to intersect a parent node, intersection testing of the child nodes of that parent node can be avoided, saving computational effort. If a ray is found to intersect a leaf node then it can be tested against the objects within the region represented by the leaf node to thereby determine which object(s) the ray intersects with. If more than one intersection is found for a ray then the closest of the intersection points to the ray's origin (i.e. the first intersection that the ray encounters in the scene) may be identified and the ray may be determined to intersect at this identified closest intersection. It is possible that there may be multiple closest hits for a ray, and in this case some tie-break logic may be used to select one of the multiple closest hits to use as the identified closest intersection. For some types of rays, the closest intersection might not need to be identified. For example, when processing shadow rays, an indication that there is at least one intersection is sufficient, without determining which of the intersections is the closest, and some APIs may allow the traversal of an acceleration structure for shadow rays to be terminated in response to finding any intersection, to thereby reduce the number of intersection tests that need to be performed. The use of an acceleration structure (rather than testing rays directly with objects in the scene) reduces the number of intersection tests that need to be performed, and simplifies the intersection tests. The intersection tests are simpler because the nodes of the acceleration structure represent basic shapes (e.g. axis-aligned bounding boxes or spheres) for which intersection tests are simpler than for more complex object shapes, e.g. defined in terms of triangular primitives for which the alignment relative to the axes of the coordinate system is not predetermined.

A ray (r) can be defined as r=O+Dt where O is a vector which represents the ray origin, D is a vector which represents the ray direction and t represents a distance along the ray from the origin. According to one approach a ray can be tested against an axis-aligned box by finding, for each of the x, y and z dimensions, an interval of t for which the ray is between the two planes representing the sides of the box which are perpendicular to that dimension. This gives three intervals for values of t (one for the x dimension, one for the y dimension and one for the z dimension). If the intersection of these three intervals (itself an interval) is empty then the ray does not intersect the axis-aligned box; whereas if the intersection of these three intervals is not empty then the ray may intersect the axis-aligned box. This intersection testing method involves performing six tests to find the three intervals of t, and then a comparison to determine whether the intersection of those intervals is empty.

According to another approach, a ray can be tested against the edges of a box that form a 2D silhouette of the box from the viewpoint of the ray. If the ray passes on the inside of each of the silhouette edges, then it is determined that the ray intersects the box, whereas if the ray passes on the outside of one or more of the silhouette edges of the box then it is determined that the ray does not intersect the box. An AABB normally has 6 silhouette edges (depending upon the orientation of the AABB from the viewpoint of the ray), so this approach normally requires six tests to be performed.

The tests described above would determine whether an infinitely long line aligned with the ray would intersect the box. However, a ray is not typically infinite in length, and may have one or more valid intervals. For example, a ray may have some minimum distance and some maximum distance from the ray origin, which may be defined in terms of a minimum value of t (referred to as a minimum culling distance, $t_{min}$), and a maximum value of t (referred to as a maximum culling distance, $t_{max}$). Therefore, a minimum distance test may be performed to check that the minimum culling distance is not greater than a largest intersection distance to an intersection point of the ray with a box; and a maximum distance test may be performed to check that the maximum culling distance is not less than a smallest intersection distance to an intersection point of the ray with the box. In the first example described above, in which intersecting intervals are used to determine whether a ray intersects a box, rather than performing separate minimum distance and maximum distance tests, a starting interval may be initialised to represent a range of t values between $t_{min}$ and $t_{max}$, such that the result of determining whether there is any intersection between the intervals will only determine that there is an intersection if an intersection occurs for a value of t between $t_{min}$ and $t_{max}$. Each of the endpoints of the range $t_{min}$ and $t_{max}$ can either be included or excluded from the interval.

Since intersection tests of rays against shapes corresponding to the nodes of an acceleration structure, e.g. axis-aligned boxes, are performed many times, it can be beneficial to implement the functionality for performing these intersection tests in dedicated hardware modules, e.g. using fixed function circuitry, rather than implementing these intersection tests using software modules executed on general purpose processing units. Software implementations generally provide more flexibility because software is more easily altered after it is designed and/or created than hardware implementations are. However, hardware implementations generally provide more efficient implementations in terms of latency and power consumption, so if the desired functionality is known in advance, hardware implementations may be preferred over software implementations. When designing a hardware implementation of an intersection testing module which is configured for performing intersection testing there are generally competing aims of having: (i) a smaller size (i.e. smaller silicon area), (ii) a lower latency, and (iii) lower power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods and intersection testing modules are provided for determining, in a ray tracing system, whether a ray intersects a 3D axis-aligned box representing a volume defined by a front-facing plane and a back-facing plane for each dimension. The front-facing plane of the box which intersects the ray furthest along the ray is identified. It is determined whether the ray intersects the identified front-facing plane at a position that is no further along the ray than positions at which the ray intersects the back-facing planes in a subset of the dimensions, and this determination is used to determine whether the ray intersects the axis-aligned box. The subset of dimensions comprises the two dimensions for which the front-facing plane was not identified, but does not comprise the dimension for which the front-facing plane was identified. It is determined whether the ray intersects the box without performing a test to determine whether the ray intersects the identified front-facing plane at a position that is no further along the ray than a position at which the ray intersects the back-facing plane in the dimension for which the front-facing plane was identified.

In particular, there is provided a method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:
identifying which of the front-facing planes of the box intersects the ray furthest along the ray;
determining whether the ray intersects the identified front-facing plane at a position that is no further along the ray than positions at which the ray intersects the back-facing planes in a subset of the dimensions, wherein the subset of dimensions comprises the two dimensions for which the front-facing plane was not identified, but wherein the subset of dimensions does not comprise the dimension for which the front-facing plane was identified; and
determining whether the ray intersects the axis-aligned box using the determination of whether the ray intersects the identified front-facing plane at a position that is no further along the ray than positions at which the ray intersects the back-facing planes in the subset of the dimensions,
wherein the method determines whether the ray intersects the box without performing a test to determine whether the ray intersects the identified front-facing plane at a position that is no further along the ray than a position at which the ray intersects the back-facing plane in the dimension for which the front-facing plane was identified.

Said steps of identifying which of the front-facing planes of the box intersects the ray furthest along the ray and determining whether the ray intersects the identified front-facing plane at a position that is no further along the ray than positions at which the ray intersects the back-facing planes in a subset of the dimensions, may be performed without computing intersection distances to any of the planes of the box.

Said identifying which of the front-facing planes of the box intersects the ray furthest along the ray may comprise:
performing a first front-facing test to determine which of a first front-facing plane and a second front-facing plane of the box the ray intersects furthest along the ray; and
performing a second front-facing test to determine which of the determined front-facing plane and a third front-facing plane of the box the ray intersects furthest along the ray, thereby identifying which of the front-facing planes of the box intersects the ray furthest along the ray.

Said identifying which of the front-facing planes of the box intersects the ray furthest along the ray may comprise:
performing a first front-facing test to determine which of a first front-facing plane and a second front-facing plane of the box the ray intersects furthest along the ray;
performing a second front-facing test to determine which of the first front-facing plane and a third front-facing plane of the box the ray intersects furthest along the ray;
performing a third front-facing test to determine which of the second front-facing plane and the third front-facing plane of the box the ray intersects furthest along the ray; and
using the results of the first, second and third front-facing tests to identify which of the front-facing planes of the box intersects the ray furthest along the ray.

The first, second and third front-facing tests may be performed in parallel.

Said determining whether the ray intersects the identified front-facing plane at a position that is no further along the ray than positions at which the ray intersects the back-facing planes in the subset of the dimensions may comprise:
  performing a first mixed-facing test to determine which of the identified front-facing plane and a first back-facing plane of the box the ray intersects furthest along the ray, wherein the first back-facing plane of the box is a back-facing plane for a first dimension in the subset of dimensions;
  performing a second mixed-facing test to determine which of the identified front-facing plane and a second back-facing plane of the box the ray intersects furthest along the ray, wherein the second back-facing plane of the box is a back-facing plane for a second dimension in the subset of dimensions; and
  using the results of the first and second mixed-facing tests to determine whether the ray intersects the identified front-facing plane at a position that is no further along the ray than positions at which the ray intersects the back-facing planes in the subset of the dimensions.

The first and second mixed-facing tests may be performed in parallel.

Said determining whether the ray intersects the identified front-facing plane at a position that is no further along the ray than positions at which the ray intersects the back-facing planes in the subset of the dimensions may comprise:
  performing a back-facing test to determine which of a first back-facing plane and a second back-facing plane of the box the ray intersects least far along the ray, wherein the first back-facing plane of the box is a back-facing plane for a first dimension in the subset of dimensions, and the second back-facing plane of the box is a back-facing plane for a second dimension in the subset of dimensions;
  performing a mixed-facing test to determine which of the identified front-facing plane and the determined back-facing plane of the box the ray intersects furthest along the ray; and
  using the result of the mixed-facing test to determine whether the ray intersects the identified front-facing plane at a position that is no further along the ray than positions at which the ray intersects the back-facing planes in the subset of the dimensions.

A front-facing test, a back-facing test or a mixed-facing test to determine which of a first plane and a second plane of the box the ray intersects furthest along the ray may comprise comparing $P_{m,i}D_j$ and $P_{n,j}D_i$, wherein $P_{m,i}$ is a constant component value of the first plane in the $i^{th}$ dimension, wherein $P_{n,j}$ is a constant component value of the second plane in the $j^{th}$ dimension, wherein $D_i$ and $D_j$ are components of a direction vector of the ray in the $i^{th}$ dimension and $j^{th}$ dimension respectively, wherein if $P_{m,i}D_j > P_{n,j}D_i$ then it may be determined that the ray intersects with the first plane further along the ray than where it intersects with the second plane, and if $P_{m,i}D_j < P_{n,j}D_i$ then it may be determined that the ray intersects with the second plane further along the ray than where it intersects with the first plane,
  wherein the first plane is either: (i) the front-facing plane for dimension i and has a component value of $P_{0,i}$ for the $i^{th}$ dimension, or (ii) the back-facing plane for dimension i and has a component value of $P_{1,i}$ for the $i^{th}$ dimension, and
  wherein the second plane is either: (i) the front-facing plane for dimension j and has a component value of $P_{0,j}$ for the $j^{th}$ dimension, or (ii) the back-facing plane for dimension j and has a component value of $P_{1,j}$ for the $j^{th}$ dimension.

The method may further comprise:
  storing one or more intermediate results which are determined in said identifying which of the front-facing planes of the box intersects the ray furthest along the ray; and
  reading the stored one or more intermediate results for use in said determining whether the ray intersects the identified front-facing plane at a position that is no further along the ray than positions at which the ray intersects the back-facing planes in the subset of the dimensions.

The intermediate results may comprise values of $P_{0,i}D_j$ and $P_{0,i}D_k$ wherein the identified front-facing plane has a component value of $P_{0,i}$ for the $i^{th}$ dimension, and wherein $D_j$ and $D_k$ are components of a direction vector of the ray in the $j^{th}$ dimension and the $k^{th}$ dimension respectively, wherein the subset of dimensions comprises the $j^{th}$ and $k^{th}$ dimensions but not the $i^{th}$ dimension.

The method may further comprise determining whether a maximum distance condition is satisfied, wherein the maximum distance condition may be satisfied if a maximum valid distance of the ray from the ray origin is greater than or equal to a minimum distance from the ray origin to any intersection of the ray with a point within the box,
  wherein said determining whether the ray intersects the axis-aligned box may further comprise using the determination of whether the maximum distance condition is satisfied.

Said determining whether a maximum distance condition is satisfied may comprise determining whether $P_{0,i} \leq D_i t_{max}$, wherein the identified front-facing plane has a component value of $P_{0,i}$ for the $i^{th}$ dimension, wherein $D_i$ is the component of a direction vector of the ray in the $i^{th}$ dimension, and wherein $t_{max}$ is a parameter which defines the maximum valid distance of the ray from the ray origin.

The method may further comprise determining whether a minimum distance condition is satisfied, wherein the minimum distance condition may be satisfied if a minimum valid distance of the ray from the ray origin is less than or equal to a maximum distance from the ray origin to any intersection of the ray with a point within the box,
  wherein said determining whether the ray intersects the axis-aligned box may further comprise using the determination of whether the minimum distance condition is satisfied.

Said determining whether a minimum distance condition is satisfied may comprise: determining whether $P_{1,i} \geq D_i t_{min}$, $P_{1,j} \geq D_j t_{min}$ and $P_{1,k} \geq D_k t_{min}$, wherein the back-facing plane for dimension i has a component value of $P_{1,i}$ the back-facing plane for dimension j has a component value of $P_{1,j}$ the back-facing plane for dimension k has a component value of $P_{1,k}$, wherein $D_i$, $D_j$ and $D_k$ are the components of a direction vector of the ray in the $i^{th}$, $j^{th}$ and $k^{th}$ dimensions respectively, and wherein $t_{min}$ is a parameter which defines the minimum valid distance of the ray from the ray origin.

Said determining whether a maximum distance condition is satisfied and said determining whether a minimum distance condition is satisfied may be performed in parallel with said determining whether the ray intersects the identified front-facing plane at a position that is no further along the ray than positions at which the ray intersects the back-facing planes in a subset of the dimensions.

There is provided a method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:

identifying which of the back-facing planes of the box intersects the ray least far along the ray;

determining whether the ray intersects the front-facing planes in a subset of the dimensions at positions that are no further along the ray than a position at which the ray intersects the identified back-facing plane, wherein the subset of dimensions comprises the two dimensions for which the back-facing plane was not identified, but wherein the subset of dimensions does not comprise the dimension for which the back-facing plane was identified; and determining whether the ray intersects the axis-aligned box using the determination of whether the ray intersects the front-facing planes in the subset of the dimensions at positions that are no further along the ray than a position at which the ray intersects the identified back-facing plane, wherein the method determines whether the ray intersects the box without performing a test to determine whether the ray intersects the front-facing plane in the dimension for which the back-facing plane was identified at a position that is no further along the ray than a position at which the ray intersects the identified back-facing plane.

Said identifying which of the back-facing planes of the box intersects the ray least far along the ray may comprise:

performing a first back-facing test to determine which of a first back-facing plane and a second back-facing plane of the box the ray intersects least far along the ray; and performing a second back-facing test to determine which of the determined back-facing plane and a third back-facing plane of the box the ray intersects least far along the ray, thereby identifying which of the back-facing planes of the box intersects the ray least far along the ray.

Said identifying which of the back-facing planes of the box intersects the ray least far along the ray may comprise:

performing a first back-facing test to determine which of a first back-facing plane and a second back-facing plane of the box the ray intersects least far along the ray;

performing a second back-facing test to determine which of the first back-facing plane and a third back-facing plane of the box the ray intersects least far along the ray;

performing a third back-facing test to determine which of the second back-facing plane and the third back-facing plane of the box the ray intersects least far along the ray; and using the results of the first, second and third back-facing tests to identify which of the back-facing planes of the box intersects the ray least far along the ray.

Said determining whether the ray intersects the front-facing planes in the subset of the dimensions at positions that are no further along the ray than a position at which the ray intersects the identified back-facing plane may comprise:

performing a first mixed-facing test to determine which of the identified back-facing plane and a first front-facing plane of the box the ray intersects furthest along the ray, wherein the first front-facing plane of the box is a front-facing plane for a first dimension in the subset of dimensions;

performing a second mixed-facing test to determine which of the identified back-facing plane and a second front-facing plane of the box the ray intersects furthest along the ray, wherein the second front-facing plane of the box is a front-facing plane for a second dimension in the subset of dimensions; and using the results of the first and second mixed-facing tests to determine whether the ray intersects the front-facing planes in the subset of the dimensions at positions that are no further along the ray than a position at which the ray intersects the identified back-facing plane.

Said determining whether the ray intersects the front-facing planes in the subset of the dimensions at positions that are no further along the ray than a position at which the ray intersects the identified back-facing plane may comprise:

performing a front-facing test to determine which of a first front-facing plane and a second front-facing plane of the box the ray intersects furthest along the ray, wherein the first front-facing plane of the box is a front-facing plane for a first dimension in the subset of dimensions, and the second front-facing plane of the box is a front-facing plane for a second dimension in the subset of dimensions;

performing a mixed-facing test to determine which of the identified back-facing plane and the determined front-facing plane of the box the ray intersects furthest along the ray; and using the result of the mixed-facing test to determine whether the ray intersects the front-facing planes in the subset of the dimensions at positions that are no further along the ray than a position at which the ray intersects the identified back-facing plane.

The method may further comprise selectively reversing the axes for the components of the ray and the axis-aligned box, such that $D_i \geq 0$, $D_j \geq 0$ and $D_k \geq 0$, before identifying which of the front-facing planes of the box intersects the ray furthest along the ray, wherein $D_i$, $D_j$ and $D_k$ are the components of a direction vector of the ray in the $i^{th}$, $j^{th}$ and $k^{th}$ dimensions respectively.

The method may further comprise subtracting respective components of an origin of the ray from respective components defining the positions of the front-facing planes and the back-facing planes of the box.

The determination of whether the ray intersects the axis-aligned box may be performed conservatively by rounding values determined for front-facing planes towards $-\infty$ and rounding values determined for back-facing planes towards $+\infty$, such that errors introduced by rounding in the determination process cannot cause a determination that the ray does not intersect the axis-aligned box if a perfectly accurate determination would have determined that the ray does intersect the axis-aligned box.

The method may further comprise outputting an indication of a result of the determination of whether the ray intersects the axis-aligned box, wherein the outputted indication may be used in the ray tracing system for rendering an image of a 3D scene.

The axis-aligned box may be an axis-aligned bounding box which bounds geometry to be rendered, and the axis-aligned box may correspond to a node of a hierarchical acceleration structure to be used for performing intersection testing in the ray tracing system.

The node may be part of a bottom-level acceleration structure (BLAS) for representing geometry in an instance space, and the method may comprise transforming the ray into the instance space.

There is provided an intersection testing module, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:
- identify which of the front-facing planes of the box intersects the ray furthest along the ray;
- determine whether the ray intersects the identified front-facing plane at a position that is no further along the ray than positions at which the ray intersects the back-facing planes in a subset of the dimensions, wherein the subset of dimensions comprises the two dimensions for which the front-facing plane was not identified, but wherein the subset of dimensions does not comprise the dimension for which the front-facing plane was identified; and
- determine whether the ray intersects the axis-aligned box using the determination of whether the ray intersects the identified front-facing plane at a position that is no further along the ray than positions at which the ray intersects the back-facing planes in the subset of the dimensions,
- wherein the intersection testing module is configured to determine whether the ray intersects the box without performing a test to determine whether the ray intersects the identified front-facing plane at a position that is no further along the ray than a position at which the ray intersects the back-facing plane in the dimension for which the front-facing plane was identified.

There is provided an intersection testing module, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:
- identify which of the back-facing planes of the box intersects the ray least far along the ray;
- determine whether the ray intersects the front-facing planes in a subset of the dimensions at positions that are no further along the ray than a position at which the ray intersects the identified back-facing plane, wherein the subset of dimensions comprises the two dimensions for which the back-facing plane was not identified, but wherein the subset of dimensions does not comprise the dimension for which the back-facing plane was identified; and
- determine whether the ray intersects the axis-aligned box using the determination of whether the ray intersects the front-facing planes in a subset of the dimensions at positions that are no further along the ray than a position at which the ray intersects the identified back-facing plane,
- wherein the intersection testing module is configured to determine whether the ray intersects the box without performing a test to determine whether the ray intersects the front-facing plane in the dimension for which the back-facing plane was identified at a position that is no further along the ray than a position at which the ray intersects the identified back-facing plane.

There is provided an intersection testing module configured to perform any of the methods described herein.

The intersection testing module may be embodied in hardware on an integrated circuit. There may be provided a method of manufacturing, at an integrated circuit manufacturing system, an intersection testing module. There may be provided an integrated circuit definition dataset that, when processed in an integrated circuit manufacturing system, configures the system to manufacture an intersection testing module. There may be provided a non-transitory computer readable storage medium having stored thereon a computer readable description of an intersection testing module that, when processed in an integrated circuit manufacturing system, causes the integrated circuit manufacturing system to manufacture an integrated circuit embodying an intersection testing module.

There may be provided an integrated circuit manufacturing system comprising: a non-transitory computer readable storage medium having stored thereon a computer readable description of the intersection testing module; a layout processing system configured to process the computer readable description so as to generate a circuit layout description of an integrated circuit embodying the intersection testing module; and an integrated circuit generation system configured to manufacture the intersection testing module according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which:

FIGS. 4a to 4j represent tests that are performed during the first method of performing intersection testing to determine whether a ray intersects a 3D axis-aligned box;

Figure 1:
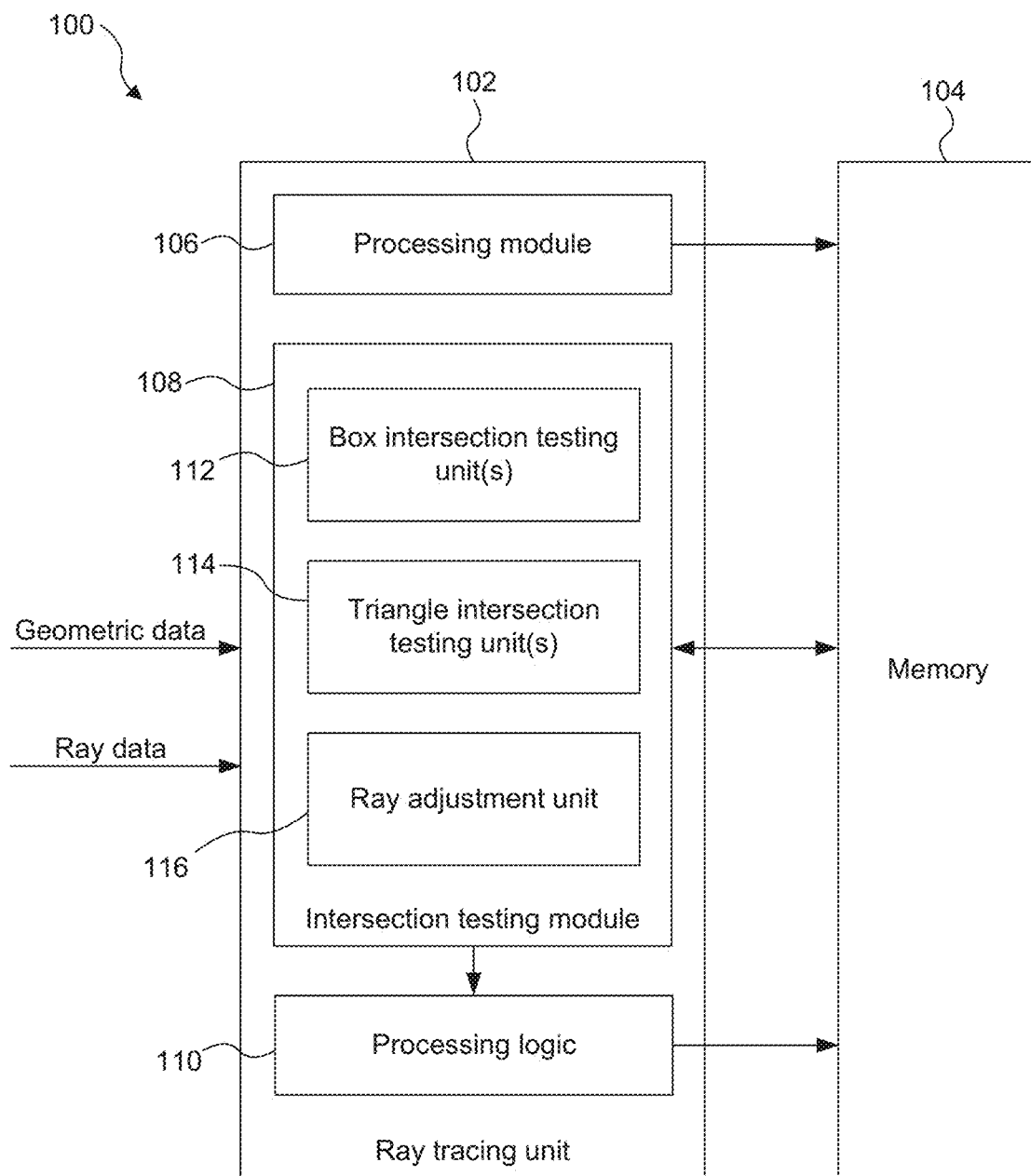
FIG. 1 shows a ray tracing system according to examples described herein.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

Even when an acceleration structure is used, the amount of work involved in performing intersection testing in a ray tracing system is still very large. For example, ray tracing may be used for rendering an image of a 3D scene, where the image may have of the order of a million pixels. A primary ray may be traced for each sample position. In some examples, there may be one sample position for each pixel position, whilst in some other examples there may be multiple sample positions for each pixel position (e.g. to allow for processes such as super sample anti-aliasing (SSAA) to be performed when rendering the final pixel values). When a ray intersects with an object in the scene, a shader can be executed which may result in the emission of another ray (i.e. a "secondary ray") into the scene. Each primary ray may result in the emission of many secondary rays, which are all traced through the scene to determine their intersections. Therefore, it would not be unusual for there to be tens or hundreds of millions of rays traced through a scene for rendering an image. The complexity of scenes to be rendered tends to increase as graphics rendering technology develops, so it would not be unusual for there to be thousands of objects in a scene, each of which may be represented by many primitives. Furthermore, the images being rendered may represent frames of a sequence of frames which are to be rendered in real-time, e.g. for display to a user in real-time. For example, the user may be playing a game wherein the rendered images represent a users view of the 3D scene as the user plays the game. In order for the sequence of frames to appear like a continuous stream of video data, many frames may be rendered per second, e.g. 24, 30 or 60 frames per second to give some examples. It can therefore be appreciated that the work involved in performing intersection testing in a ray tracing system to render scenes to be output in real-time is vast.

One way to overcome this problem, and to perform ray tracing to render scenes to be output in real-time would be to have one or more supercomputers to perform all of the processing. This could be considered to be a 'brute force' approach. However, as well as an aim to have high performance (to perform ray tracing to render scenes to be output in real-time), there are also competing aims of reducing the size (e.g. silicon area) and power consumption of the ray tracing system. For example, there may be an aim to implement the ray tracing system on a mobile device, such as a tablet or smartphone, for which the acceptable size and power consumption may be much lower than for a supercomputer. As such, when designing a ray tracing system, there may be a trade-off between performance, power consumption and area. Depending on how this trade-off is implemented, examples described herein may allow the performance to be increased without a significant increase to the power consumption and area (compared to the prior art described above in the background section). Alternatively, in a different implementation of the trade-off, examples described herein may allow the power consumption and/or size of the ray tracing system to be decreased without significantly decreasing the performance of the ray tracing system (compared to the prior art described above in the background section). Different implementations can be designed to target different points in the trade-off between performance, power consumption and silicon area.

As described above, testing rays for intersection with Axis Aligned Bounding Boxes (AABBs), which correspond with nodes of an acceleration structure, is an extremely frequent operation in a ray tracing system. In particular, the intersection testing of rays with bounding volumes (i.e. determining whether a ray intersects an axis-aligned box) usually accounts for most of the intersection tests that are performed to render an image of a scene using ray tracing. Therefore, any optimizations that can be made to the way in which the intersection tests are performed can be very useful for optimizing the ray tracing system in terms of reducing the latency, power consumption and physical size of the ray tracing system.

In the two examples given in the background section, six tests (plus minimum and maximum distance tests) are performed to determine whether a ray intersects an axis-aligned box. However, according to examples described herein, the number of tests that need to be performed to determine whether a ray intersects an axis-aligned box is reduced. In particular, the number of tests is reduced to four or five (plus minimum and maximum distance tests) in the main examples described herein. Furthermore, in some situations as described below with reference to FIGS. 4c, 4f, 4g and 4j, one of these tests might not be necessary, in which case the number of tests could be further reduced to three or four (plus minimum and maximum distance tests). This can be achieved by making use of the fact that, unlike a general object which may have no correlation between planes/faces defining the object, an AABB's planes are clearly arranged in parallel pairs, such that for each dimension the AABB has a front-facing plane and a parallel back-facing plane. For a pair of parallel planes of the AABB, the front-facing (FF) plane is the one that the ray will intersect first and the back-facing (BF) plane is the one that the ray will intersect second. If a ray intersects with the box then it will enter the box through a front-facing plane and it will exit the box through a back-facing plane. The number of tests that need to be performed to determine whether a ray intersects an axis-aligned box can be reduced by making use of organisation of the planes of the axis-aligned box. Reducing the number of tests that need to be performed in order to determine whether a ray intersects an axis-aligned box can reduce the latency, size and/or power consumption of an intersection testing module in a ray tracing system.

FIG. 1 shows a ray tracing system 100 comprising a ray tracing unit 102 and a memory 104. The ray tracing unit 102 comprises a processing module 106, an intersection testing module 108 and processing logic 110. The intersection testing module 108 comprises one or more box intersection testing units 112, one or more triangle intersection testing units 114 and a ray adjustment unit 116. In operation the ray tracing unit 102 receives geometric data defining objects within the 3D scene. The ray tracing unit 102 also receives ray data defining rays that are to be tested for intersection. The rays may be primary rays or secondary rays. The processing module 106 is configured to generate an acceleration structure based on the geometric data, and to send the acceleration structure to the memory 104 for storage therein. After the acceleration structure has been stored in the memory 104, the intersection testing module 108 can retrieve nodes (comprising data defining the axis-aligned boxes corresponding to the nodes) of the acceleration structure from the memory 104 to perform intersection testing of rays against the retrieved nodes. To avoid reading in the whole acceleration structure at a time, the intersection testing module 108 retrieves a subset of the boxes from one level of the acceleration structure from memory 104 at each stage, based on the results of previous intersection tests. The box intersection testing unit(s) 112 perform intersection tests to determine whether or not a ray intersects each of the bounding boxes corresponding to nodes of the acceleration structure (where a miss can cull vast swathes of the hierarchical acceleration structure). If a leaf node is intersected then the triangle intersection testing unit(s) 114 perform one or more triangle intersection tests to determine which object(s) (if any) the ray intersects. The results of the intersection tests indicate which object in the scene a ray intersects, and the results may also indicate a position on the object at which the ray intersects the object, and may also indicate a distance along the ray that the intersection occurs. The results of the intersection testing are provided to the processing logic 110. The processing logic 110 is configured to process the results of the intersection testing to determine rendered values representing the image of the 3D scene. The rendered values determined by the processing logic 110 can be passed back to the memory 104 for storage therein to represent the image of the 3D scene.

Figure 2A:
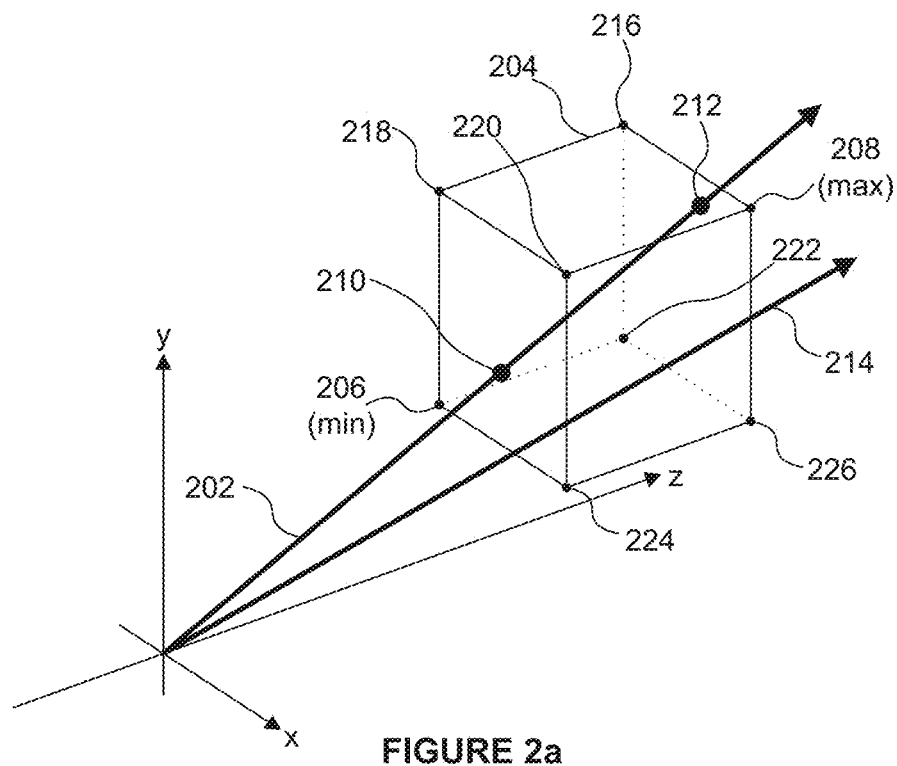
FIG. 2a shows two rays and a box from a first viewpoint.
Figure 2B:
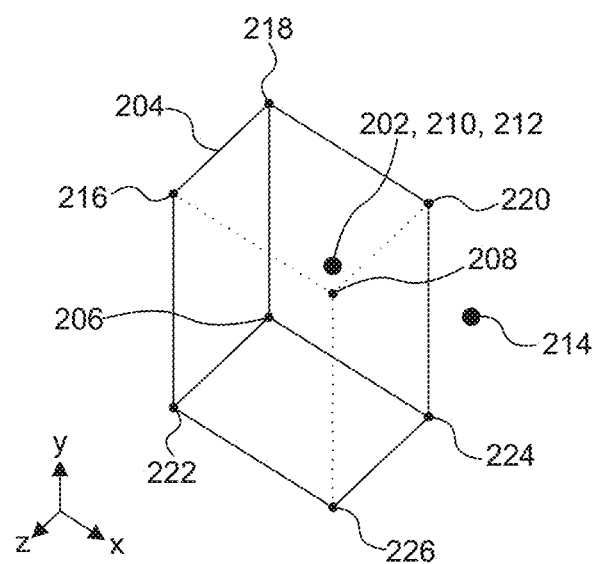
FIG. 2b shows the rays and the box from a second viewpoint, wherein the second viewpoint is at the origin of the rays.

FIG. 2a illustrates two rays 202 and 214 and a box 204 from a first viewpoint. As described above, the rays 202 and 214, r(t), can be represented as r(t)=O+Dt , where O is a vector representing the origin of the ray and D is the direction vector of the ray, where O=($O_x$, $O_y$, $O_z$) and D=($D_x$,$D_y$,$D_z$). The x, y and z basis vectors of the coordinate system are shown in FIGS. 2a and 2b. In this example, both of the rays 202 and 214 have the same origin and the origin of the coordinate system is at the origin of the rays. This can be achieved by translating the positions of the ray origins and the box by subtracting the ray origin. The box 204 is an axis-aligned box with respect to the x, y and z basis vectors of the coordinate system. The coordinate system could be a world space coordinate system of a scene being rendered, or the coordinate system could be an instance space coordinate system of an instance of a set of geometry within a scene being rendered. The corner 206 of the box 204 is at a position ($x_{min}$, $y_{min}$, $z_{min}$) and the opposite corner 208 of the box is at a position ($x_{max}$, $y_{max}$, $z_{max}$). The box 204 represents a volume defined by a front-facing plane and a back-facing plane for each dimension of the three-dimensional axis-aligned box. In particular, for the x dimension there is: (i) a front-facing plane (including corner points 206, 216, 218 and 222) which has a normal which is parallel to the x-axis and which points towards negative values of x, wherein any point on the front-facing plane for the x dimension has an x component value of $x_{min}$; and (ii) a back-facing plane (including corner points 208, 220, 224 and 226) which has a normal which is parallel to the x-axis and which points towards positive values of x, wherein any point on the back-facing plane for the x dimension has a x component value of $x_{max}$. For the y dimension there is: (i) a front-facing plane (including corner points 206, 222, 224 and 226) which has a normal which is parallel to the y-axis and which points towards negative values of y, wherein any point on the front-facing plane for the y dimension has a y component value of $y_{min}$; and (ii) a back-facing plane (including corner points 208, 216, 218 and 220) which has a normal which is parallel to the y-axis and which points towards positive values of y, wherein any point on the back-facing plane for the y dimension has a y component value of $y_{max}$. For the z dimension there is: (i) a front-facing plane (including corner points 206, 218, 220 and 224) which has a normal which is parallel to the z-axis and which points towards negative values of z, wherein any point on the front-facing plane for the z dimension has a z component value of $z_{min}$; and (ii) a back-facing plane (including corner points 208, 216, 222 and 226) which has a normal which is parallel to the z-axis and which points towards positive values of z, wherein any point on the back-facing plane for the z dimension has a z component value of $z_{max}$. In the example shown in FIG. 2a, the rays 202 and 214 and the box 204 are all in the positive octant of the coordinate system, i.e. the direction vectors of rays 202 and 214 have positive values for all of their component values, and all of $x_{min}$, $y_{min}$, $z_{min}$, $x_{max}$, $y_{max}$ and $z_{max}$ are positive.

FIG. 2b shows the rays 202 and 214 and the box 204 from a second viewpoint, wherein the second viewpoint is at the origin of the rays. Since the viewpoint of FIG. 2b is the origin of the rays 202 and 214, the rays just appear as points. The x, y and z axes are shown in FIG. 2b. The corners of the box 204 are labelled as 206, 208, 216, 218, 220, 222, 224 and 226 consistently in both FIGS. 2a and 2b to aid the understanding of how the box 204 is viewed in the two figures.

The ray 202 intersects the box 204. In particular, the ray 202 intersects planes of the box at positions 210 and 212. In FIG. 2b, the intersection points 210 and 212 are at the same projected position as the ray 202. The ray 202 enters the box 204 at position 210 which is on the front-facing plane of the box 204 for the z dimension, which has a constant z component value of $z_{min}$. The ray 202 exits the box 204 at position 212 which is on the back-facing plane of the box 204 for the y dimension, which has a constant y component value of $y_{max}$. The ray 214 does not intersect the box 204.

Figure 3:
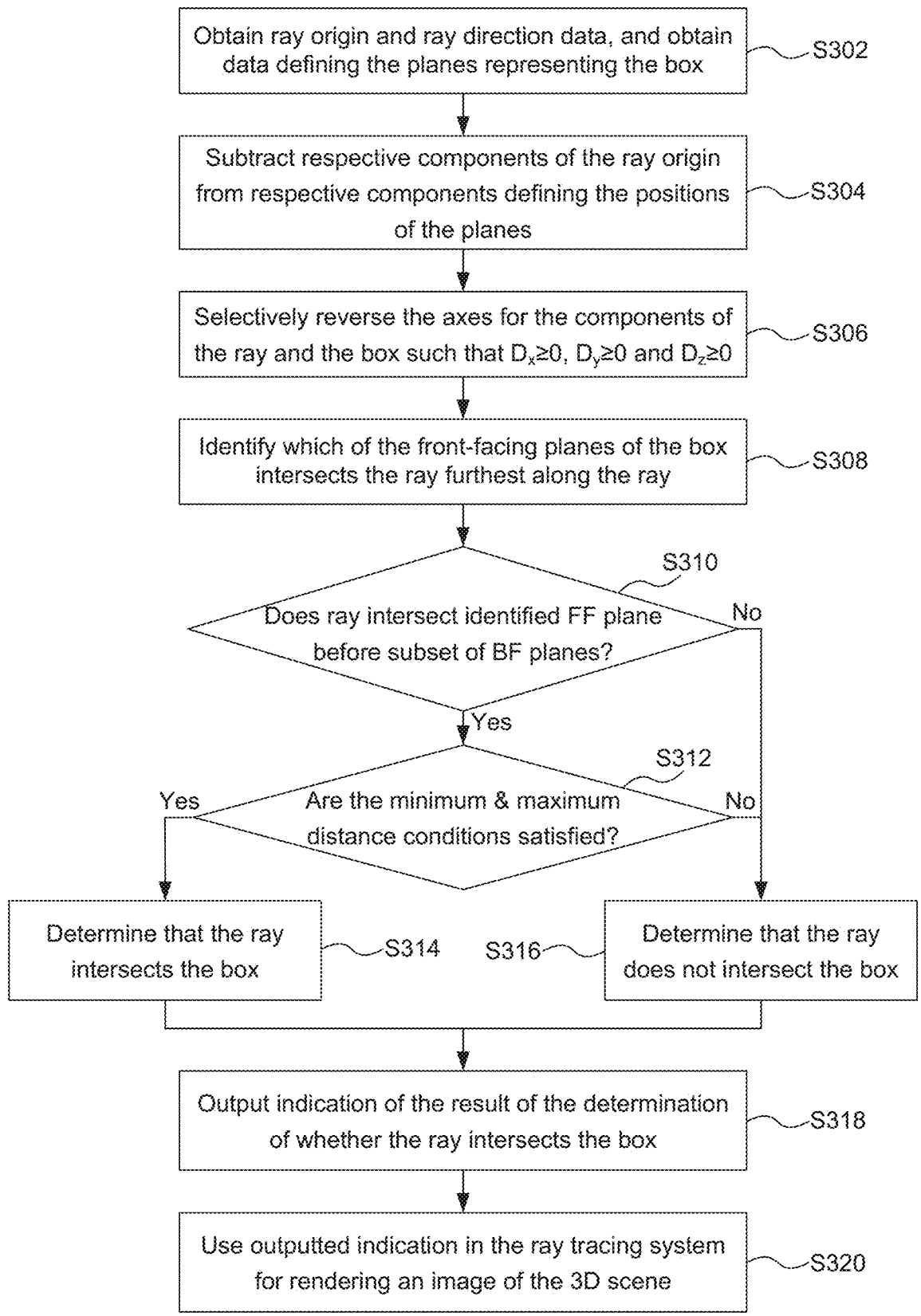
FIG. 3 is a flow chart for a first method of performing intersection testing to determine whether a ray intersects a 3D axis-aligned box according to examples described herein.

FIG. 3 is a flow chart for a method of performing intersection testing to determine whether the ray 202 intersects the 3D axis-aligned box 204. Although the description below refers to testing whether the ray 202 intersects the box 204, the same method can be applied for testing whether the ray 214 intersects the box 204.

In step S302 data defining the ray 202 and the box 204 are obtained at the intersection testing module 108. In particular, data defining the components of the ray origin and the ray direction are obtained. The data defining the ray origin may be the three components of the ray origin position, $O_x$, $O_y$, and $O_z$. The data defining the ray direction may comprise the three components of the ray direction, $D_x$, $D_y$, and $D_z$. Alternatively, some different values defining the ray direction may have been pre-computed and stored in a store, such that in step S302 the pre-computed values may be read. For example, three values may be read to define the ray direction data, and these three values may be $$\frac{D_x}{D_z}, \frac{D_y}{D_z} \text{ and } \frac{1}{D_z}.$$

In other examples, different pre-computed values may be read to define the ray direction, e.g. values of $$\frac{D_z}{D_x}, \frac{D_z}{D_y}$$

and $D_z$ may be read, or values of $$\frac{D_x}{D_z}, \frac{D_y}{D_z}$$

and $sgn(D_z)$ may be read. It is noted that, for a value f, $sgn(f)=+1$ if f is positive, and $sgn(f)=-1$ if f is negative. In other examples, other values may be pre-computed and read in order to define the ray direction. The data defining the box may be data defining the positions of the planes representing the box, e.g. the component values which are constant for each of the front-facing plane and the back-facing plane in each of the three dimensions.

In step S304, the intersection testing module 108 subtracts respective components of the origin of the ray from respective components defining the positions of the front-facing planes and the back-facing planes of the box. Step S304 can be described as performing a translation on the ray 202 and the box 204 so that the origin of the coordinate system is at the origin of the ray 202. From this point on in the method described with reference to FIG. 3, the origin of the ray is at the origin of the coordinate system, i.e. at a position (0,0,0).

In step S306 the axes for the components of the ray and the box are selectively reversed by the intersection testing module 108 (e.g. by the ray adjustment unit 116), such that $D_x \geq 0$, $D_y \geq 0$ and $D_z \leq 0$. In the method described with reference to FIG. 3, the selective reversing of zero, one or more of the axes is performed so that the ray direction is into the octant with positive $D_x$, $D_y$ and $D_z$. The "reversing" of the axes, may be referred to as "reflecting", "inverting" or "negating", and may involve changing the sign of all of the component values in the dimension along the axis in question. The data defining the ray comprises the ray origin and the ray direction, and the data defining the box comprises the values representing the positions of the planes of the in each dimension. It is noted that reversing an odd number of the axes reverses the orientation of the geometry. In some examples, step S306 may also include the intersection testing module 108 (e.g. by the ray adjustment unit 116) selectively permuting (i.e. rearranging) the axes. A permutation of the axes comprises either a rotation of three axes, a transposition of two axes or the identity (i.e. not changing the axes). For example, a permutation of the axes may be performed so that the major component of the ray direction is $D_z$ (i.e. ensuring that $|D_z| \geq |D_x|$ and $|D_z| \geq |D_y|$). However, a permutation is not necessary in the example described with reference to FIG. 3. At the end of step S306, the intersection testing module 108 has determined the values of $x_{min}$, $y_{min}$, $z_{min}$, $x_{max}$, $y_{max}$ and $z_{max}$. The values of $x_{min}$, $y_{min}$, $z_{min}$, $x_{max}$, $y_{max}$ and $z_{max}$ represent displacements of the front-facing and back-facing planes of the axis aligned box in each dimension relative to the ray origin.

FIGS. 2a and 2b show the ray 202 and the box 204 after the translation and the selective reversing of the axes of the ray and the box have been performed in steps S304 and S306, such that the origin of the coordinate system is at the origin of the ray, and such that $D_x \geq 0$, $D_y \geq 0$ and $D_z \geq 0$.

Unlike a general object which may have no correlation between planes/faces defining the object, the planes defining the faces of an axis-aligned bounding box (AABB) are arranged in parallel pairs, such that for each dimension the AABB has a front-facing plane and a parallel back-facing plane. As described above, the axes are selectively reversed such that the ray direction vector points into the octant of the space-coordinate system which has positive values for x, y and z, i.e. $D_x \geq 0$, $D_y \geq 0$ and $D_z > 0$. Therefore, the front-facing plane for an axis has a lower constant component value along that axis than the back-facing plane for the axis. For a pair of parallel planes of the AABB, the front-facing (FF) plane is the one that the ray will intersect first (when looking along the direction of the ray from $-\infty$) and the back-facing (BF) plane is the one that the ray will intersect second (when looking along the direction of the ray from $-\infty$). If a ray intersects with the box 204 (for which all of $x_{min}$, $y_{min}$, $z_{min}$, $x_{max}$, $y_{max}$ and $z_{max}$ are positive) then it will enter the box through a front-facing plane and it will exit the box through a back-facing plane. This generalises so that if a box is placed behind a ray origin (such that intersection may occur for negative t), the front-facing plane is intersected by the ray at the lower (most negative) value of t and the back-facing plane is intersected by the ray at the higher (least negative) value of t. It is also noted that if the ray points parallel to any pair of planes (i.e. if at least one of $D_x$, $D_y$ and $D_z$ is zero), then it will intersect, at most, one of the planes of the pair of planes, whereas if a ray is not parallel to a pair of planes then there are unique entry and exit points of the (infinite) volume bounded by the front- and back-facing planes of the pair of planes respectively.

In step S308 the intersection testing module 108 (specifically the one or more box intersection testing units 112) identifies which of the front-facing planes of the box intersects the ray furthest along the ray. As described above, for each dimension the box 204 has a front-facing plane and a back-facing plane. A ray will intersect the front-facing plane for a dimension before it intersects the back-facing plane for the dimension (unless the ray is parallel to the axis, which is described in more detail below). Because of the selective reversing of the axes in step S306, such that the ray is directed into the positive octant of the space coordinate system defined by the x, y and z axes, the front-facing plane for a dimension will have the minimum component value for that dimension (e.g. $x_{min}$, $y_{min}$ or $z_{min}$), and the back-facing plane for a dimension will have the maximum component value for that dimension (e.g. $x_{max}$, $y_{max}$ or $z_{max}$). If the ray origin lies outside the box and if the ray enters and exits a box then the ray enters the box through a front-facing plane, and the ray exits the box through a back-facing plane. In particular, if a ray enters and exits a box then the ray enters the box through the front-facing plane which (out of the three front-facing planes of the box) intersects the ray furthest along the ray, and the ray exits the box through the back-facing plane which (out of the three back-facing planes) intersects the ray least far along the ray. In the case of a tie, the ray enters (or exits) the box on multiple front-facing (or back-facing) planes, either on a corner (if all faces tie) or an edge (if two faces tie). The phrase "furthest along the ray" is to be understood here as meaning "at a point with the greatest t value" (in the ray equation $r(t)=O+Dt$) and the phrase "least far along the ray" is to be understood here as meaning "at a point with the lowest t value" (in the ray equation r(t)=O+Dt). Therefore, in the examples described herein, the phrases "furthest along" and "least far along" are referring to the ray direction vector, rather than meaning "furthest from the ray origin" or "least far from the ray origin".

Two example approaches for identifying which of the front-facing planes of the box intersects the ray furthest along the ray in step S308 are described in detail below. In the examples described below we refer to i, j and k dimensions which can correspond to the x, y and z dimensions of the coordinate system in any order or arrangement.

A First Approach for Identifying Which of the Front-Facing Planes of the Box Intersects the Ray Furthest Along the Ray in Step S308

In the first approach for performing step S308 described herein, step S308 comprises: (i) performing a first front-facing test to determine which of a first front-facing plane and a second front-facing plane of the box the ray intersects furthest along the ray, and (ii) performing a second front-facing test to determine which of the determined front-facing plane and a third front-facing plane of the box the ray intersects furthest along the ray, thereby identifying which of the front-facing planes of the box intersects the ray furthest along the ray. In this approach, two tests are performed sequentially. The second test uses the result of the first test.

As described above, a point on the ray 202 is given by O+Dt where O is the ray origin, D is the ray direction and t represents a distance along the ray from the origin. Due to step S304, the components of the remapped ray origin are all zero. The components of the ray direction vector are $D_i$, $D_j$ and $D_k$, where, as described above, i, j and k correspond to the x, y and z dimensions in any order. A ray will intersect a position $Dt_1$ before it intersects a position $Dt_2$ if $t_1 < t_2$. The ray will intersect the front-facing plane for dimension i when the parameter t has a value such that $D_i t = F_i$, where $F_i$ is the component value for the $i^{th}$ dimension which is constant on that plane; and the ray will intersect the front-facing plane for dimension j when the parameter t has a value such that $D_j t = F_j$, where $F_j$ is the component value for the $j^{th}$ dimension which is constant on that plane. Depending on how the $i^{th}$ and $j^{th}$ dimensions respectively correspond to the x, y or z dimensions, the values of $F_i$ and $F_j$ will each be one of $x_{min}$, $y_{min}$ and $z_{min}$. Therefore, the ray will intersect the front-facing plane for dimension i before it intersects the front-facing plane for dimension j if $$\frac{F_i}{D_i} < \frac{F_j}{D_j}.$$

However, performing division operations is typically more expensive (in terms of latency, silicon area and/or power consumption) than performing multiply operations, so rather than performing a comparison to compare values of $$\frac{F_i}{D_i} \text{ and } \frac{F_j}{D_j},$$

the method can instead perform a comparison to compare values of $F_i D_j$ and $F_j D_i$. In this way, the operations are cross-multiplied to avoid needing to perform a divide operation in the comparison. If $F_i D_j < F_j D_i$ then it is determined that the ray intersects with front-facing plane j further along the ray than where it intersects with front-facing plane i, and if $F_i D_j > F_j D_i$ then it is determined that the ray intersects with front-facing plane i further along the ray than where it intersects with front-facing plane j. This comparison involves performing two multiply operations and a comparison of the results of the two multiply operations. Note that if $F_i D_j = F_j D_i$ then, in effect, the ray intersects the edge where the planes meet. In this case it is equally valid to choose either plane as the "further", and the choice does not affect the validity of the testing process, so either one of the front-facing planes can be chosen. Multiply and compare operations are not costly to implement in hardware relative to division or to subtract operations, e.g. they can be implemented in hardware (e.g. fixed-function circuitry) with a small silicon area. Division and subtraction operations to produce floating point results are relatively expensive (e.g. in terms of silicon area) to implement in hardware. Therefore, implementing multiply and compare operations to determine whether $F_i D_j > F_j D_i$ is cheaper (e.g. in terms of silicon area) to implement in hardware than implementing division and compare operations to determine whether $$\frac{F_i}{D_i} > \frac{F_j}{D_j}$$

or implementing multiply and subtract operations to determine whether $F_i D_j - F_j D_i > 0$. It is noted that the coordinate system has already been adjusted so that the $D_i$ and $D_j$ values are $\geq 0$ (and that special cases for D=0 will be covered later), so that the comparison operators "<" and/or ">" do not need to be changed to accommodate for the possibility of negative values of $D_i$ and $D_j$.

FIGS. 4a and 4b illustrate the first front-facing test to determine whether $F_i D_j > F_j D_i$. In particular, FIGS. 4a and 4b show an axis-aligned box 402 with three front-facing planes and three back-facing planes, as viewed from the viewpoint of the origin of a ray (similar to FIG. 2b). The edge 404 defines a line (which is shown as a dashed line) which is where the front-facing planes for the $i^{th}$ and $j^{th}$ dimensions intersect. Following the first front-facing test to determine whether $F_i D_j > F_j D_i$ it is known which side of the line defined by the edge 404 the ray passes on. Therefore, this comparison can be considered to be an edge test on the edge 404. This comparison can also be considered to be a test of which of the two front-facing planes (for dimensions i and j) intersects the ray furthest along the ray. The dotted region to one side of the line defined by the edge 404 represents a region which it is known that the ray does not intersect due to the determination of whether $F_i D_j > F_j D_i$. In other words, the determination of whether $F_i D_j > F_j D_i$ determines that the ray passes somewhere in the undotted region to the other side of the line defined by the edge 404. FIG. 4a shows the situation in which the ray passes to the right of the line defined by the edge 404, i.e. $F_i D_j > F_j D_i$ such that the front-facing plane for dimension i intersects the ray further along the ray than where the front-facing plane for dimension j intersects the ray. In contrast, FIG. 4b shows the situation in which the ray passes to the left of the line defined by the edge 404, i.e. $F_i D_j < F_j D_i$ such that the front-facing plane for dimension j intersects the ray further along the ray than where the front-facing plane for dimension i intersects the ray. As mentioned above, if $F_i D_j = F_j D_i$ then either of the front-facing planes for dimensions i and j can be chosen. For example, if the ray intersects the line defined by the edge 404 then it can be considered to be in both the undotted regions shown in FIGS. 4a and 4b.

In the second front-facing test, the front-facing plane which was determined to intersect the ray furthest along the ray in the first front-facing test is tested against the remaining front-facing plane to determine which of the front-facing planes of the box intersects the ray furthest along the ray. For example, if it was determined that the front-facing plane for dimension i intersects the ray further along the ray than where the front-facing plane for dimension j intersects the ray (i.e. in the situation shown in FIG. 4a) then the second front-facing test comprises determining whether $F_iD_k>F_kD_i$, as illustrated in FIGS. 4c and 4d. The edge 406 defines a line (which is shown as a dashed line) which is where the front-facing planes for the $i^{th}$ and $k^{th}$ dimensions intersect. Following the second front-facing test to determine whether $F_iD_k>F_kD_i$ it is known which side of the line defined by the edge 406 the ray passes on. Therefore, this comparison can be considered to be an edge test on the edge 406. This comparison can also be considered to be a test of which of the two front-facing planes (for dimensions i and k) intersects the ray furthest along the ray. The dotted region to one side of the line defined by the edge 406 represents a region which it is known that the ray does not intersect due to the determination of whether $F_iD_k>F_kD_i$. In other words, the determination of whether $F_iD_k>F_kD_i$ determines that the ray passes somewhere in the undotted region to the other side of the line defined by the edge 406. FIG. 4c shows the situation in which the ray passes below the line defined by the edge 406, i.e. $F_iD_k<F_kD_i$ such that the front-facing plane for dimension k intersects the ray further along the ray than where the front-facing plane for dimension i intersects the ray. Therefore, in the situation shown in FIG. 4c, step S308 identifies the front-facing plane for dimension k. In contrast, FIG. 4d shows the situation in which the ray passes above the line defined by the edge 406, i.e. $F_iD_k>F_kD_i$ such that the front-facing plane for dimension i intersects the ray further along the ray than where the front-facing plane for dimension k intersects the ray. Therefore, in the situation shown in FIG. 4d, step S308 identifies the front-facing plane for dimension i. As mentioned above, if $F_iD_k=F_kD_i$ then either of the front-facing planes for dimensions i and k can be chosen.

If it was determined that the front-facing plane for dimension j intersects the ray further along the ray than where the front-facing plane for dimension i intersects the ray (i.e. in the situation shown in FIG. 4b) then the second front-facing test comprises determining whether $F_jD_k>F_kD_j$, as illustrated in FIGS. 4e and 4f. The edge 408 defines a line (which is shown as a dashed line) which is where the front-facing planes for the $j^{th}$ and $k^{th}$ dimensions intersect. Following the second front-facing test to determine whether $F_jD_k>F_kD_j$ it is known which side of the line defined by the edge 408 the ray passes on. Therefore, this comparison can be considered to be an edge test on the edge 408. This comparison can also be considered to be a test of which of the two front-facing planes (for dimensions j and k) intersects the ray furthest along the ray. The dotted region to one side of the line defined by the edge 408 represents a region which it is known that the ray does not intersect due to the determination of whether $F_jD_k>F_kD_j$. In other words, the determination of whether $F_jD_k>F_kD_j$ determines that the ray passes somewhere in the undotted region to the other side of the line defined by the edge 408. FIG. 4e shows the situation in which the ray passes above the line defined by the edge 408, i.e. $F_jD_k>F_kD_j$ such that the front-facing plane for dimension j intersects the ray further along the ray than where the front-facing plane for dimension k intersects the ray. Therefore, in the situation shown in FIG. 4e, step S308 identifies the front-facing plane for dimension j. In contrast, FIG. 4f shows the situation in which the ray passes below the line defined by the edge 408, i.e. $F_jD_k<F_kD_j$ such that the front-facing plane for dimension k intersects the ray further along the ray than where the front-facing plane for dimension j intersects the ray. Therefore, in the situation shown in FIG. 4f, step S308 identifies the front-facing plane for dimension k. As mentioned above, if $F_jD_k=F_kD_j$ then either of the front-facing planes for dimensions j and k can be chosen.

A Second Approach for Identifying Which of the Front-Facing Planes of the Box Intersects the Ray Furthest Along the Ray in Step S308

In the second approach for performing step S308 described herein, step S308 comprises: (i) performing a first front-facing test to determine which of a first front-facing plane and a second front-facing plane of the box the ray intersects furthest along the ray; (ii) performing a second front-facing test to determine which of the first front-facing plane and a third front-facing plane of the box the ray intersects furthest along the ray; and (iii) performing a third front-facing test to determine which of the second front-facing plane and the third front-facing plane of the box the ray intersects furthest along the ray. The results of the first, second and third front-facing tests are used to identify which of the front-facing planes of the box intersects the ray furthest along the ray. In this second approach, the first, second and third front-facing tests are performed independently of each other (i.e. they do not require results from one another), and so these three tests may be performed in parallel.

This second approach can be considered to be performing three front-facing tests to test which side of each of the lines defined by the three edges 404, 406 and 408 the ray passes on. For example, the first front-facing test may determine whether $F_iD_j>F_jD_i$. If $F_iD_j>F_jD_i$ then the front-facing plane for dimension i intersects the ray further along the ray than where the front-facing plane for dimension j intersects the ray (e.g. the ray passes on the right of the line defined by edge 404); whereas if $F_iD_j<F_jD_i$ then the front-facing plane for dimension j intersects the ray further along the ray than where the front-facing plane for dimension i intersects the ray (e.g. the ray passes on the left of the line defined by edge 404). The second front-facing test may determine whether $F_iD_k>F_kD_i$. If $F_iD_k>F_kD_i$ then the front-facing plane for dimension i intersects the ray further along the ray than where the front-facing plane for dimension k intersects the ray (e.g. the ray passes above the line defined by edge 406); whereas if $F_iD_k<F_kD_i$ then the front-facing plane for dimension k intersects the ray further along the ray than where the front-facing plane for dimension i intersects the ray (e.g. the ray passes below the line defined by edge 406). The third front-facing test may determine whether $F_jD_k>F_kD_j$. If $F_jD_k>F_kD_j$ then the front-facing plane for dimension j intersects the ray further along the ray than where the front-facing plane for dimension k intersects the ray (e.g. the ray passes above the line defined by edge 408); whereas if $F_jD_k<F_kD_j$ then the front-facing plane for dimension k intersects the ray further along the ray than where the front-facing plane for dimension j intersects the ray (e.g. the ray passes below the line defined by edge 408). As described above, the results of the first, second and third front-facing tests can be used to identify which of the front-facing planes of the box intersects the ray furthest along the ray.

In the first approach for performing step S308 described above, two front-facing tests are performed in series; whereas in the second approach for performing step S308 described above, three front-facing tests are performed, and these three tests may be performed in parallel. In some implementations, it may be considered beneficial to reduce the number of tests that need to be performed, so the first approach for performing step S308 may be used because this involves performing two front-facing tests rather than three. However, in some other implementations, it may be considered beneficial to shorten the processing pipeline (e.g. to reduce latency), so the second approach for performing step S308 may be used because the front-facing tests in step S308 can all be performed in parallel together, rather than performing the tests in series.

At the end of step S308, the intersection testing module 108 has identified which of the front-facing planes of the box the ray intersects furthest along the ray (e.g. as illustrated in FIGS. 4c to 4f).

In step S310 the intersection testing module 108 (specifically the one or more box intersection testing units 112) determines whether the ray 202 intersects the identified front-facing plane at a position that is no further along the ray than positions at which the ray intersects the back-facing planes in a subset of the dimensions. The term "subset" as used in this context refers to a proper subset. In other words, the subset of the dimensions does not include all of the dimensions. In particular, the subset of dimensions comprises the two dimensions for which the front-facing plane was not identified, but the subset of dimensions does not comprise the dimension for which the front-facing plane was identified. This is because the inventors have realised that for each dimension, a ray will intersect the front-facing plane of an axis-aligned box for that dimension before it intersects the back-facing plane of the axis-aligned box for that dimension. This is partly because the front-facing plane and back-facing plane of an axis-aligned box for a particular dimension are parallel. So without performing any tests, the intersection testing module 108 can know that the ray 202 intersects the identified front-facing plane before it intersects the back-facing plane in the dimension for which the front-facing plane was identified. This realisation allows the number of tests that need to be performed to determine whether a ray intersects an axis-aligned box to be reduced. Two example approaches for determining whether the ray intersects the identified front-facing plane before it intersects the back-facing planes in the subset of the dimensions in step S310 are described in detail below.

A First Approach for Determining Whether the Ray Intersects the Identified Front-Facing Plane at a Position that is no Further Along the Ray than Positions at Which the Ray Intersects the Back-Facing Planes in the Subset of the Dimensions in Step S310

In the first approach for performing step S310 described herein, step S310 comprises: (i) performing a first mixed-facing test to determine which of the identified front-facing plane and a first back-facing plane of the box the ray intersects furthest along the ray, wherein the first back-facing plane of the box is a back-facing plane for a first dimension in the subset of dimensions; (ii) performing a second mixed-facing test to determine which of the identified front-facing plane and a second back-facing plane of the box the ray intersects furthest along the ray, wherein the second back-facing plane of the box is a back-facing plane for a second dimension in the subset of dimensions; and (iii) using the results of the first and second mixed-facing tests to determine whether the ray intersects the identified front-facing plane at a position that is no further along the ray than positions at which the ray intersects the back-facing planes in the subset of the dimensions. In this approach, the first and second mixed-facing tests do not depend upon the results of one another so they may be performed in parallel. It is noted that the term "front-facing test" is used herein to refer to a test to compare the distances at which two front-facing planes intersect the ray; the term "back-facing test" is used herein to refer to a test to compare the distances at which two back-facing planes intersect the ray; and the term "mixed-facing test" is used herein to refer to a test to compare the distances at which a front-facing plane and a back-facing plane intersect the ray.

FIGS. 4g to 4j illustrate the tests that are performed in step S310 in different situations. For example, FIGS. 4g and 4j follow on from the situations shown in FIGS. 4c and 4f respectively in which the front-facing plane for dimension k was identified in step S308. In these two cases the first and second mixed-facing tests determine which side of the lines defined by the two edges 410 and 412 the ray passes on. For example, the first mixed-facing test may determine whether $F_k D_i > B_i D_k$, where $F_k$ is the component value for the $k^{th}$ dimension which is constant on that front-facing plane for dimension k, and $B_i$ is the component value for the $i^{th}$ dimension which is constant on the back-facing plane for dimension i. This test corresponds to testing which side of the line defined by the edge 410 the ray passes on. If $F_k D_i > B_i D_k$ then the front-facing plane for dimension k intersects the ray further along the ray than where the back-facing plane for dimension i intersects the ray (e.g. the ray passes below the line defined by edge 410) such that the ray will miss the box; whereas if $F_k D_i \leq B_i D_k$ then the front-facing plane for dimension k intersects the ray no further along the ray than where the back-facing plane for dimension i intersects the ray (e.g. the ray passes above the line defined by edge 410) such that the ray might intersect the box. The second mixed-facing test may determine whether $F_k D_j > B_j D_k$, where $B_j$ is the component value for the $j^{th}$ dimension which is constant on the back-facing plane for dimension j. This test corresponds to testing which side of the line defined by the edge 412 the ray passes on. If $F_k D_j > B_j D_k$ then the front-facing plane for dimension k intersects the ray further along the ray than where the back-facing plane for dimension j intersects the ray (e.g. the ray passes below the line defined by edge 412) such that the ray will miss the box; whereas if $F_k D_j \leq B_j D_k$ then the front-facing plane for dimension k intersects the ray no further along the ray than where the back-facing plane for dimension j intersects the ray (e.g. the ray passes above the line defined by edge 412) such that the ray might intersect the box. It is noted that the values of one or both of $F_k D_j$ and $F_k D_i$ may have been calculated in step S308. These values may be recalculated in step S310 or they may be saved (e.g. in registers) during step S308 so that they can be reused in step S310 without needing to recalculate them.

For the ray to intersect the box, the ray must intersect the identified front-facing plane at a point that is no further from the ray origin than the points at which the ray intersects the back-facing planes of the box. In examples described herein, a test does not need to be performed to determine whether the ray intersects the identified front-facing plane before it intersects the back-facing plane for the dimension for which the front-facing plane was identified. In some examples (e.g. as described in the preceding paragraph), both the first mixed-facing test and the second mixed-facing test must pass for a hit to be determined for the ray with respect to the box, i.e. two tests are performed to determine that the ray does not intersect the respective back-facing planes for the two dimensions in the subset of dimensions before the ray intersects the identified front-facing plane. However, in some other examples, in some situations one of the mixed-facing tests is not required to be performed. For example, in the situation shown in FIG. 4*j*, only one mixed-facing test is required in step S310 (i.e. to test which side of the line defined by the edge 410 the ray passes on). If the box intersection testing unit(s) 112 can determine that the geometry of the box is such that only one test needs to be performed (e.g. in the situation shown in FIG. 4*j* but not in the situation shown in FIG. 4*g*) then only one test needs to be performed in step S310.

As another example, FIG. 4*h* follows on from the situation shown in FIG. 4*d* in which the front-facing plane for dimension i was identified in step S308. In this case the first and second mixed-facing tests determine which side of the lines defined by the two edges 414 and 416 the ray passes on. For example, the first mixed-facing test may determine whether $F_iD_j>B_jD_i$, where $F_i$ is the component value for the $i^{th}$ dimension which is constant on that front-facing plane for dimension i, and $B_j$ is the component value for the $j^{th}$ dimension which is constant on the back-facing plane for dimension j. This test corresponds to testing which side of the line defined by the edge 416 the ray passes on. If $F_iD_j>B_jD_i$ then the front-facing plane for dimension i intersects the ray further along the ray than where the back-facing plane for dimension j intersects the ray (e.g. the ray passes to the right of the line defined by edge 416) such that the ray will miss the box; whereas if $F_iD_j\leq B_jD_i$ then the front-facing plane for dimension i intersects the ray no further along the ray than where the back-facing plane for dimension j intersects the ray (e.g. the ray passes to the left of the line defined by edge 416) such that the ray might intersect the box. The second mixed-facing test may determine whether $F_iD_k>B_kD_i$, where $B_k$ is the component value for the $k^{th}$ dimension which is constant on the back-facing plane for dimension k. This test corresponds to testing which side of the line defined by the edge 414 the ray passes on. If $F_iD_k>B_kD_i$ then the front-facing plane for dimension i intersects the ray further along the ray than where the back-facing plane for dimension k intersects the ray (e.g. the ray passes above the line defined by edge 414) such that the ray will miss the box; whereas if $F_iD_k\leq B_kD_i$ then the front-facing plane for dimension i intersects the ray no further along the ray than where the back-facing plane for dimension k intersects the ray (e.g. the ray passes below the line defined by edge 414) such that the ray might intersect the box. It is noted that the values of one or both of $F_iD_j$ and $F_iD_k$ may have been calculated in step S308. These values may be recalculated in step S310 or they may be saved (e.g. in registers) during step S308 so that they can be reused in step S310 without needing to recalculate them.

As another example, FIG. 4*i* follows on from the situation shown in FIG. 4*e* in which the front-facing plane for dimension j was identified in step S308. In this case the first and second mixed-facing tests determine which side of the lines defined by the two edges 418 and 420 the ray passes on. For example, the first mixed-facing test may determine whether $F_jD_k>B_kD_j$, where $F_j$ is the component value for the $j^{th}$ dimension which is constant on that front-facing plane for dimension j. This test corresponds to testing which side of the line defined by the edge 418 the ray passes on. If $F_jD_k>B_kD_j$ then the front-facing plane for dimension j intersects the ray further along the ray than where the back-facing plane for dimension k intersects the ray (e.g. the ray passes above the line defined by edge 418) such that the ray will miss the box; whereas if $F_jD_k\leq B_kD_j$ then the front-facing plane for dimension j intersects the ray no further along the ray than where the back-facing plane for dimension k intersects the ray (e.g. the ray passes below the line defined by edge 418) such that the ray might intersect the box. The second mixed-facing test may determine whether $F_jD_i>B_iD_j$. This test corresponds to testing which side of the line defined by the edge 420 the ray passes on. If $F_jD_i>B_iD_j$ then the front-facing plane for dimension j intersects the ray further along the ray than where the back-facing plane for dimension i intersects the ray (e.g. the ray passes to the left of the line defined by edge 420) such that the ray will miss the box; whereas if $F_jD_i\leq B_iD_j$ then the front-facing plane for dimension j intersects the ray no further along the ray than where the back-facing plane for dimension i intersects the ray (e.g. the ray passes to the right of the line defined by edge 420) such that the ray might intersect the box. It is noted that the values of one or both of $F_jD_k$ and $F_jD_i$ may have been calculated in step S308. These values may be recalculated in step S310 or they may be saved (e.g. in registers) during step S308 so that they can be reused in step S310 without needing to recalculate them.

A Second Approach for Determining Whether the Ray Intersects the Identified Front-Facing Plane at a Position that is no Further Along the Ray than Positions at Which the Ray Intersects the Back-Facing Planes in the Subset of the Dimensions in Step S310

In the second approach for performing step S310 described herein, step S310 comprises: (i) performing a back-facing test to determine which of a first back-facing plane and a second back-facing plane of the box the ray intersects least far along the ray, wherein the first and second back-facing planes of the box are back-facing planes for first and second dimensions in the subset of dimensions; (ii) performing a mixed-facing test to determine which of the identified front-facing plane and the determined back-facing plane of the box the ray intersects furthest along the ray; and (iii) using the result of the mixed-facing test to determine whether the ray intersects the identified front-facing plane at a position that is no further along the ray than positions at which the ray intersects the back-facing planes in the subset of the dimensions.

In other words, in this approach, the closest back-facing plane for the ray is determined, and then the intersection testing module 108 determines whether the furthest front-facing plane (i.e. the identified front-facing plane) is further along the ray than the closest back-facing plane. If it is, then the ray misses the box.

For example, in FIGS. 4*c* and 4*f* the front-facing plane for dimension k was identified in step S308. In these two cases the back-facing test determines which of the back-facing planes for dimensions i and j intersects the ray least far along the ray. The back-facing test may determine whether $B_iD_j>B_jD_i$. If $B_iD_j>B_jD_i$ then the back-facing plane for dimension j intersects the ray less far along the ray than where the back-facing plane for dimension i intersects the ray; whereas if $B_iD_j<B_jD_i$ then the back-facing plane for dimension i intersects the ray less far along the ray than where the back-facing plane for dimension j intersects the ray. If $B_iD_j=B_jD_i$ then either of the back-facing planes for dimensions i or j can be chosen. The mixed-facing test may determine whether $F_kD_{near}>B_{near}D_k$, where the dimension (either i or j in this case) for which the back-facing plane is determined to be least far along the ray is denoted "near". If $F_kD_{near}>B_{near}D_k$ then the front-facing plane for dimension k intersects the ray further along the ray than where the determined back-facing plane intersects the ray, such that the ray will miss the box; whereas if $F_kD_{near}\leq B_{near}D_k$ then the front-facing plane for dimension k intersects the ray no further along the ray than where the determined back-facing plane intersects the ray. This means that the ray might intersect the box, subject to the minimum and maximum distance conditions described below.

In the example shown in FIG. 4d the front-facing plane for dimension i was identified in step S308. In this case the back-facing test determines which of the back-facing planes for dimensions j and k intersects the ray least far along the ray. The back-facing test may determine whether $B_jD_k>B_kD_j$. If $B_jD_k>B_kD_j$ then the back-facing plane for dimension k intersects the ray less far along the ray than where the back-facing plane for dimension j intersects the ray; whereas if $B_jD_k<B_kD_j$ then the back-facing plane for dimension j intersects the ray less far along the ray than where the back-facing plane for dimension k intersects the ray. If $B_jD_k=B_kD_j$ then either of the back-facing planes for dimensions j or k can be chosen. The mixed-facing test may determine whether $F_iD_{near}>B_{near}D_i$, where the dimension (either j or k in this case) for which the back-facing plane is determined to be least far along the ray is denoted "near". If $F_iD_{near}>B_{near}D_i$ then the front-facing plane for dimension i intersects the ray further along the ray than where the determined back-facing plane intersects the ray, such that the ray will miss the box; whereas if $F_iD_{near} \leq B_{near}D_i$ then the front-facing plane for dimension i intersects the ray no further along the ray than where the determined back-facing plane intersects the ray. This means that the ray might intersect the box, subject to the minimum and maximum distance conditions described below.

In the example shown in FIG. 4e the front-facing plane for dimension j was identified in step S308. In this case the back-facing test determines which of the back-facing planes for dimensions i and k intersects the ray least far along the ray. The back-facing test may determine whether $B_iD_k>B_kD_i$. If $B_iD_k>B_kD_i$ then the back-facing plane for dimension k intersects the ray less far along the ray than where the back-facing plane for dimension i intersects the ray; whereas if $B_iD_k<B_kD_i$ then the back-facing plane for dimension i intersects the ray less far along the ray than where the back-facing plane for dimension k intersects the ray. If $B_iD_k=B_kD_i$ then either of the back-facing planes for dimensions i or k can be chosen. The mixed-facing test may determine whether $F_jD_{near}>B_{near}D_j$, where the dimension (either i or k in this case) for which the back-facing plane is determined to be least far along the ray is denoted "near". If $F_jD_{near}>B_{near}D_j$ then the front-facing plane for dimension j intersects the ray further along the ray than where the determined back-facing plane intersects the ray, such that the ray will miss the box; whereas if $F_jD_{near} \leq B_{near}D_j$ then the front-facing plane for dimension j intersects the ray no further along the ray than where the determined back-facing plane intersects the ray. This means that the ray might intersect the box, subject to the minimum and maximum distance conditions described below.

Steps S308 and S310 do not involve computing intersection distances to any of the planes of the box. Instead, steps S308 and S310 involve performing tests (e.g. front-facing tests, back-facing tests and mixed-facing tests) to determine, for a pair of planes, which of the planes intersects the ray further along the ray. This is achieved in examples described herein by comparing the values of cross-multiplications, which does not involve computing intersection distances to the planes of the box. Intersection distances do not need to be computed for the box intersection tests performed by the box intersection testing unit(s) 112. An intersection distance to a plane of the box is the distance from the ray origin to the point on the plane where the ray intersects the plane.

In general, the front-facing tests, back-facing tests and mixed-facing tests described above in relation to steps S308 and S310, which are performed to determine which of a first plane and a second plane of the box the ray intersects furthest along the ray, comprise comparing values of the form $P_{m,i}D_j$ and $P_{n,j}D_i$, where $P_{m,i}$ is a component value of the first plane in the ith dimension, where $P_{n,j}$ is a component value of the second plane in the jth dimension, and where $D_i$ and $D_j$ are components of the direction vector of the ray in the ith dimension and jth dimension respectively. In this notation, the values of m and n indicate whether the plane is a front-facing plane or a back-facing plane, wherein for front-facing planes the value of m or n may be 0, and for back-facing planes the value of m or n may be 1. For example, $P_{0,i}=F_i$, $P_{1,i}=B_i$, $P_{0,j}=F_j$ and $P_{1,j}=B_j$. If $P_{m,i}D_j>P_{n,j}D_i$ then it is determined that the ray intersects with the first plane ($P_{m,i}$) further along the ray than where it intersects with the second plane ($P_{n,j}$), and if $P_{m,i}D_j<P_{n,j}D_i$ then it is determined that the ray intersects with the second plane ($P_{n,j}$) further along the ray than where it intersects with the first plane ($P_{m,i}$). Comparisons of this form may be performed by performing two multiply operations and a compare operation. These operations are simple to implement (e.g. in hardware), in the box intersection testing unit(s) 112 of the intersection testing module.

As described above, in some examples, one or more intermediate results which are determined in step S308 may be stored, and then in step S310 the stored one or more intermediate results can be read for use in determining whether the ray intersects the identified front-facing plane before it intersects the back-facing planes in the subset of the dimensions. The intermediate results may comprise values of $F_iD_j$ and $F_iD_k$ if the front-facing plane in the $i^{th}$ dimension was identified in step S308; the intermediate results may comprise values of $F_jD_i$ and $F_jD_k$ if the front-facing plane in the $j^{th}$ dimension was identified in step S308; and the intermediate results may comprise values of $F_kD_j$ and $F_kD_i$ if the front-facing plane in the $k^{th}$ dimension was identified in step S308.

Returning to FIG. 3, at the end of step S310 the intersection testing module has determined whether the ray would intersect the axis-aligned box if the ray were infinitely long. This determination is used to determine whether the ray intersects the axis-aligned box. It is noted again that the method determines whether the ray intersects the box without performing a test to determine whether the ray intersects the identified front-facing plane before it intersects the back-facing plane in the dimension for which the front-facing plane was identified. In this way, the method described herein avoids performing some of the tests by making some tests conditional on previous results. Furthermore, it is noted again that intersection distances are not computed directly for any of the planes of the box.

In examples described above, step S310 includes at most two tests (and in some situations it is possible to just perform one test in step S310, e.g. in the situation shown in FIG. 4j). Step S308 includes two or three tests depending on which approach is taken. Therefore, if the first approach to step S308 is used (in which step S308 involves performing two tests), the total number of tests is at most four, and may in some situations, just be three, e.g. in the situation shown in FIG. 4j). Furthermore, if the second approach to step S308 is used (in which step S308 involves performing three tests), the total number of tests is at most five, and may in some situations, just be four, e.g. in the situation shown in FIG. 4j). If it was determined in step S310 that the ray does not intersect the identified front-facing plane at a position that is no further along the ray than positions at which the ray intersects the back-facing planes in the subset of the dimensions then it is known that the ray misses the box, and the method passes from step S310 to step S316 in which it is determined that the ray misses the box (i.e. it does not intersect the box). If it is determined in step S310 that the ray does intersect the identified front-facing plane at a position that is no further along the ray than positions at which the ray intersects the back-facing planes in the subset of the dimensions then the method passes to step S312.

Figure 5A:
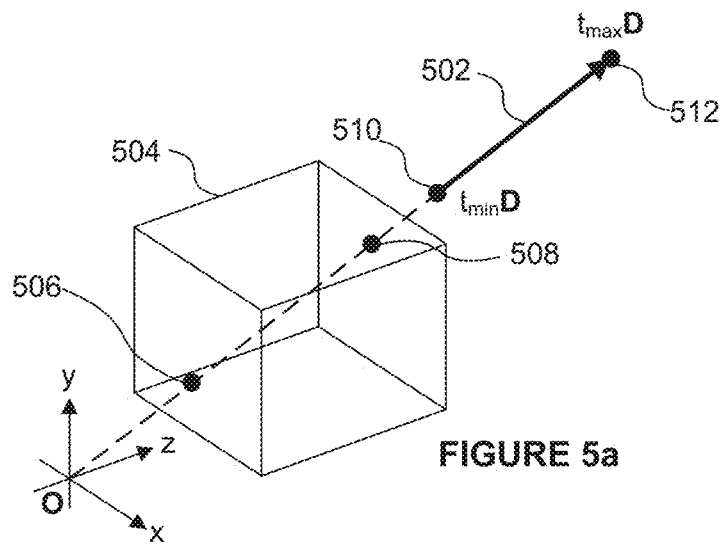
FIG. 5a shows a ray and a box where the start of the ray is beyond the box.

In step S312 the intersection testing module 108 (specifically the box intersection testing unit(s) 112) determines whether a minimum distance condition and a maximum distance condition are satisfied. The minimum distance condition is satisfied if a minimum valid distance of the ray from the ray origin is less than or equal to a maximum distance from the ray origin to any intersection of the ray with a point within the box. In other words, the minimum distance condition is satisfied if the start of the ray (defined by a value of tmin) is not beyond the box when travelling along the direction vector of the ray. FIG. 5a shows an example in which the intersection testing module 108 determines whether a ray 502 intersects a box 504. In step S310 it will be determined that the ray 502 intersects the identified front-facing plane of the box 504 before it intersects the back-facing planes of the box 504, such that the ray 502 may intersect the box 504. In particular the ray 502 intersects a front-facing plane of the box 504 at point 506, and intersects a back-facing plane of the box 504 at point 508. In some examples $t_{min}=0$ such that the minimum distance of the ray from the ray origin is zero, but in the example shown in FIG. 5a $t_{min} \neq 0$. It is noted that because of the selective reversing of the x, y and z components of the ray and the box in step S306, the direction vector of the ray will be in the positive octant, i.e. $D_x \geq 0$, $D_y \geq 0$, and $D_z \geq 0$. In the example shown in FIG. 5a the minimum valid distance of the ray from the ray origin 510 is greater than the maximum distance from the ray origin to any intersection of the ray with a point within the box, at point 508. Therefore, in this example, in step S312 it will be determined that the minimum distance condition is not satisfied. For example, the determination of whether a minimum distance condition is satisfied may comprise determining whether $B_i \geq D_i t_{min}$, $B_j \geq D_j t_{min}$ and $B_k \geq D_k t_{min}$. As described above, $t_{min}$ is a parameter which defines the minimum valid distance of the ray from the ray origin. If all three of $B_i \geq D_i t_{min}$, $B_j \geq D_j t_{min}$ and $B_k \geq D_k t_{min}$ are true then the minimum distance condition is satisfied; whereas if any one of $B_i < D_i t_{min}$, $B_j < D_j t_{min}$ and $B_k < D_k t_{min}$ is true then the minimum distance condition is not satisfied.

In some examples, $t_{min}$ cannot be negative, and it is also noted that due to the selective reversing of the x, y and z components performed in step S306, $D_i \geq 0$, $D_j \geq 0$, and $D_k \geq 0$. Therefore, in these examples, if any of the back-facing planes of the box have negative constant values, i.e. if $B_i < 0$, $B_j < 0$ or $B_k < 0$ (i.e. if any of $x_{max}$, $y_{max}$ or $z_{max}$ are negative), then the box is behind the ray, and thus the intersection testing module 108 can determine that the ray misses the box. This determination may be performed at any point after step S306, and if this determination determines that the ray misses the box because the box is behind the ray (which may be referred to as a "pantomime box") then the method may jump straight to step S316 without performing some or all of the tests described herein in relation to steps S308, S310 and S312.

In the more general notation used above, $B_i$, $B_j$ and $B_k$ can be denoted as $P_{1,i}$, $P_{1,j}$ and $P_{1,k}$ respectively. As will become apparent after the following description of the maximum distance condition, it is noted that the maximum distance condition is satisfied in the example shown in FIG. 5a because the maximum valid distance of the ray from the ray origin at point 512 is greater than the minimum distance from the ray origin to an intersection of the ray with the box at point 506.

Figure 5B:
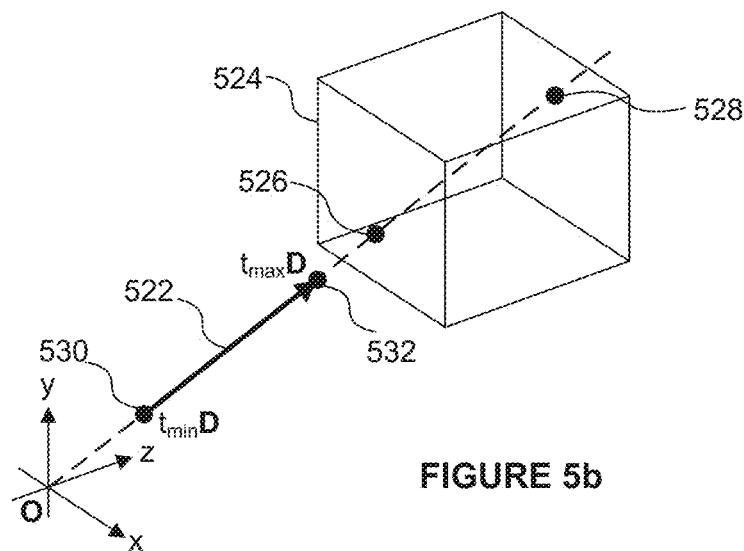
FIG. 5b shows a ray and a box where the end of the ray is before the box.

The maximum distance condition is satisfied if a maximum valid distance of the ray from the ray origin is greater than or equal to a minimum distance from the ray origin to any intersection of the ray direction vector with a point within the box. In other words, the maximum distance condition is satisfied if the end of the ray (defined by a value of $t_{max}$) is not before the box when travelling along the direction vector of the ray. FIG. 5b shows an example in which the intersection testing module 108 determines whether a ray 522 intersects a box 524. In step S310 it will be determined that the ray 522 intersects the identified front-facing plane of the box 524 before it intersects the back-facing planes of the box 524, such that the ray 522 may intersect the box 524. In particular the ray 522 intersects a front-facing plane of the box 524 at point 526, and intersects a back-facing plane of the box 524 at point 528. In the example shown in FIG. 5b the maximum valid distance of the ray from the ray origin 532 is less than the minimum distance from the ray origin to the intersection of the ray 522 with the front-facing plane of the box 524 at point 526. Therefore, in this example, in step S312 it will be determined that the maximum distance condition is not satisfied. It is noted that the minimum distance condition is satisfied in the example shown in FIG. 5b because the minimum valid distance of the ray from the ray origin at point 530 is less than the maximum distance from the ray origin to any intersection of the ray with a point within the box, at point 528. In step S308 the front-facing plane of the box which intersects with the ray furthest along the ray has been identified, and this identification can be used to simplify the process of determining whether the maximum distance satisfied. For example, if the front-facing plane for dimension i is identified in step S308, where i could be any of the x, y or z dimensions, the test for determining whether a maximum distance condition is satisfied comprises determining whether $F_i \leq D_i t_{max}$. The other two dimensions can be ignored because it is only the point at which the ray intersects the identified front-facing plane that matters for the maximum distance condition. As described above, $t_{max}$ is a parameter which defines the maximum valid distance of the ray from the ray origin. If $F_i \leq D_i t_{max}$ then the maximum distance condition is satisfied; whereas if $F_i > D_i t_{max}$ then the maximum distance condition is not satisfied. In the more general notation used above, $F_i$ can be denoted $P_{0,i}$.

Figure 5C:
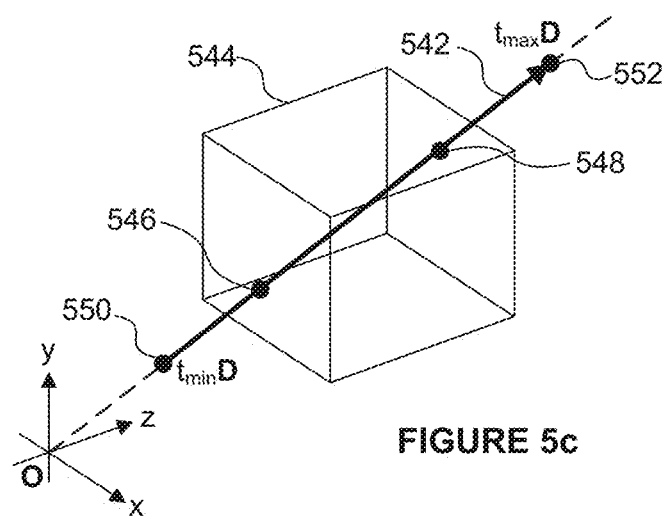
FIG. 5c shows a ray and a box where the start of the ray is before the box and the end of the ray is beyond the box.

FIG. 5c shows an example in which the intersection testing module 108 determines whether a ray 542 intersects a box 544. In step S310 it will be determined that the ray 542 intersects the identified front-facing plane of the box 544 before it intersects the back-facing planes of the box 544, such that the ray 542 may intersect the box 544. In particular the ray 542 intersects a front-facing plane of the box 544 at point 546, and intersects a back-facing plane of the box 544 at point 548. In the example shown in FIG. 5c, the minimum distance condition is satisfied because the minimum valid distance of the ray from the ray origin at point 550 is less than the maximum distance from the ray origin to any point of intersection of the ray with the volume of the box at point 548. Also, in the example shown in FIG. 5c, the maximum distance condition is satisfied because the maximum valid distance of the ray from the ray origin at point 552 is greater than the minimum distance from the ray origin to any point of intersection of the ray with the volume of the box at point 546.

The tests performed in step S312 for determining whether a maximum distance condition is satisfied and for determining whether a minimum distance condition is satisfied may be performed in parallel with the tests performed in step S310 for determining whether the ray intersects the identified front-facing plane before it intersects the back-facing planes in a subset of the dimensions. This is because the tests performed in step S312 do not depend upon the results of the tests performed in step S310. Performing the tests in parallel may be particularly beneficial in implementations in which the box intersection testing unit(s) 112 are implemented in hardware, (e.g. in fixed function circuitry). In other examples (e.g. in which the box intersection testing unit(s) 112 are implemented in software, e.g. modules of computer code executed on a processing unit) the tests performed in steps S310 and S312 may be performed sequentially wherein a second of the tests is performed only if a first test does not determine a miss for the ray with respect to the box, and a third of the tests is performed only if the first and second tests do not determine a miss for the ray with respect to the box, and so on. This sequential approach allows a miss to be determined without necessarily performing all of the tests (if earlier tests in the sequence have determined a miss for the ray with respect to the box).

The determinations in step S312 of whether the minimum distance condition and maximum distance condition are satisfied are used to determine whether the ray intersects the axis-aligned box. If one or both of the minimum distance condition and the maximum distance condition are not satisfied (e.g. in the examples shown in FIGS. 5a and 5b) then the method passes from step S312 to step S316 in which the intersection testing module 108 (specifically the box intersection testing unit(s) 112) determines that the ray does not intersect the box. However, if both of the minimum distance condition and the maximum distance condition are satisfied (e.g. in the example shown in FIG. 5c) then the method passes from step S312 to step S314 in which the intersection testing module 108 (specifically the box intersection testing unit(s) 112) determines that the ray does intersect the box. It is noted that in order to arrive at step S314, i.e. in order for the intersection testing module to determine that the ray intersects the axis-aligned box, it will have determined that the ray intersects the identified front-facing plane of the box at a position that is no further along the ray than positions at which the ray intersects the back-facing planes of the box (in step S310), and it will have determined that maximum distance and minimum distance conditions are satisfied (in step S312).

Following steps S314 and/or S316 the method passes to step S318 in which the intersection testing module 108 outputs an indication of the result of the determination of whether the ray intersects the box. This indication could be a binary indication (e.g. a one-bit flag) to indicate either a 'hit' or a 'miss' of the ray in respect of the box. In other examples, the indications could have different forms. In step S320, the outputted indication is used in the ray tracing system 100 (e.g. by the processing logic 110) for rendering an image of a 3D scene. For example, the box may bound geometry to be rendered in a scene. If the box corresponds to a node of a hierarchical acceleration structure to be used for performing intersection testing in the ray tracing system then the indication of whether the ray intersects the box can be used to determine whether to test the ray for intersection with boxes corresponding to any child nodes of the node corresponding to the intersected box. For example, if a ray intersects a box corresponding to a parent node then the ray is tested for intersection with boxes corresponding to the child nodes of that parent node, whereas if a ray does not intersect a box corresponding to a parent node then the ray is not tested for intersection with boxes corresponding to the child nodes of that parent node. If a ray intersects a box corresponding to a leaf node of the hierarchical acceleration structure then the ray can be tested for intersection with any geometry (e.g. triangles or other primitives) that are referenced by the leaf node.

In the example shown in FIG. 3, the data defining the ray and the box is read in step S302, and then in step S304 the components of the ray origin are subtracted from the data defining the position of the box, and then in step S306 the x, y and z components of the ray and the box are selectively reversed so that $D_x \geq 0$, $D_y \geq 0$ and $D_z > 0$. However, the ordering of these three steps (steps S302 to S306) may be different in different examples. For example, the selective reversing of the x, y and z components of the ray and the box data may be performed before the data is obtained by the intersection testing module 108. It can be useful to perform this selective reversing of the x, y and z components of the data before the data is read in, so that we know that $D_x \geq 0$, $D_y \geq 0$ and $D_z \geq 0$ before the data is read in. This allows some pre-computation of the data to be performed and the pre-computed data can be stored in a store (e.g. a memory on the ray tracing unit 102) before it is read into the intersection testing module 108. This means that the processing involved in this pre-computation can be performed once for a ray and used multiple times if the ray is involved in multiple intersection tests. Furthermore, in some examples, the subtraction of the components of the ray origin from the components defining the positions of the planes of the box could be performed in a pre-processing stage, before the data is obtained by the intersection testing module 108.

The method is described above for use in a ray tracing system which does not introduce any errors into its calculations. However, some calculations, e.g. calculations performed using numbers in a floating point format may introduce rounding errors. This is partly because the precision with which floating point numbers can be represented varies for numbers of different magnitudes. The 'steps' between sequential floating point numbers are generally approximately proportional to the magnitude of the floating point values (with some exceptions, e.g. in the neighbourhood of zero). In some examples, the box intersection testing unit(s) 112 of the intersection testing module 108 are configured to operate conservatively when testing AABBs. In particular, the tests that are performed in steps S308, S310 and S312 can be made to operate conservatively. This means that the method may sometimes give 'false positive' results (i.e. it might sometimes indicate that a ray intersects a box even though it does not), but the method will not give 'false negative' results (i.e. it will not indicate that a ray does not intersect a box when it does in fact intersect the box). False positive results will not introduce rendering errors into the ray tracing process because if a ray is determined to intersect a box then it will be tested for intersection against a further object bounded by the box (e.g. another box corresponding to a child node, or a piece of geometry), so it will ultimately be found not to intersect the further object. False positive results may reduce the efficiency of the intersection testing process by increasing the number of tests that are performed, but this is acceptable provided that the proportion of positive results which are false positive results (rather than true positive results) is low, e.g. less than 1%. So, a small number of false positive results is acceptable in the ray-box intersection testing process. However, 'false negative' results may introduce rendering errors into the ray tracing process because if a ray is determined to miss a box then it will not be tested for intersection with a further object bounded by the box even though the ray might actually intersect the further object. Rendering errors are not normally acceptable, so false negative results are not acceptable in the ray-box intersection testing process.

So in some examples, the determination of whether the ray intersects the axis-aligned box is performed conservatively by rounding values determined for front-facing planes towards $-\infty$ and rounding values determined for back-facing planes towards $+\infty$, such that errors introduced by rounding in the determination process cannot cause a determination that the ray does not intersect the axis-aligned box if a perfectly accurate determination would have determined that the ray does intersect the axis-aligned box. For example, the multiplications involving front-facing planes in steps S308, S310 and/or S312 (e.g. $F_iD_j$ or $F_jD_k$ to give two examples) are rounded towards a smaller value. Similarly, the subtractions performed in step S304 should round down for the positions of the front-facing planes. However, the multiplications involving back-facing planes in steps S308, S310 and/or S312 (e.g. $B_iD_j$ or $B_jD_k$ to give two examples) are rounded towards a larger value. Similarly, the subtractions performed in step S304 should round up for the positions of the back-facing planes.

In some examples, a top-level acceleration structure (TLAS) may be used to represent a scene in a world space coordinate system. Nodes of the TLAS correspond to boxes (e.g. AABBs which are aligned to the axes of the world space coordinate system) representing regions in the scene. A set of geometry (e.g. representing an object) may be defined and one or more instances of the set of geometry can be inserted into respective positions within the scene. The set of geometry is defined in an instance space coordinate system, and a bottom-level acceleration structure (BLAS) is created with nodes corresponding to boxes (e.g. AABBs which are aligned to the axes of the instance space coordinate system) representing regions in the instance space. One or more nodes of the TLAS may reference nodes of a BLAS. A ray first traverses nodes of the TLAS, wherein if the ray is found to intersect with a node that references a node of a BLAS then the ray can be tested for intersection with boxes corresponding to nodes of the BLAS. The intersection testing module 108 (e.g. the ray adjustment unit 116) can transform the ray into the instance space coordinate system in order to be tested for intersection with boxes corresponding to nodes of the BLAS. The boxes described herein could correspond to nodes of a TLAS (i.e. the boxes could be axis-aligned boxes in world space), or the boxes described herein could correspond to nodes of a BLAS (i.e. the boxes could be axis-aligned boxes in an instance space).

If one of the components of the ray direction vector is zero (i.e. if $D_x=0$, $D_y=0$ or $D_z=0$) then the ray is parallel to the front and back facing planes of the box in that dimension. When a plane is parallel to the ray, there are two cases to consider: either the ray is entirely outside of the half space defined by the plane (which automatically indicates a miss) or the ray is entirely inside the half-space defined by the plane. Because the box test is conservative, the case where the ray lies "in the plane" is deemed as "inside".

If $D_i=0$, where i is any one or x, y or z, then the ray is entirely inside the front-facing plane of the box for the $i^{th}$ dimension if $F_i \leq 0$; whereas the ray is entirely outside the front-facing plane of the box for the $i^{th}$ dimension if $F_i>0$. Furthermore, the ray is entirely inside the back-facing plane of the box for the $i^{th}$ dimension if $B_i \geq 0$; whereas the ray is entirely outside the back-facing plane of the box for the $i^{th}$ dimension if $B_i<0$. If the ray is determined to be entirely outside one or both of the front-facing plane and the back-facing plane then the intersection testing module 108 determines that the ray does not intersect the box. This test can be performed before step S308, and if this test determines that the ray is parallel to, and entirely outside of, a plane of the box then the method can go straight to step S316, e.g. without performing one or more of the tests of steps S308, S310 or S312. However, if the ray is parallel to the planes of the box in the $i^{th}$ dimension but is entirely inside both the front-facing plane and the back-facing plane for the $i^{th}$ dimension then the ray may still intersect the box. During step S308, if a front-facing parallel plane is being tested with another front-facing plane to see which intersects the ray furthest along the ray then the other front-facing plane is chosen. If both of the front-facing planes being compared in step S308 are parallel, then either can be chosen. It is not possible for all three front-facing planes to be parallel unless the ray direction is invalid. During step S310, a back-facing parallel plane can be ignored, i.e. it is considered that the ray intersects a front-facing plane before the back-facing parallel plane.

In the examples described above, a front-facing plane is identified (in step S308) and then it is determined (in step S310) whether the identified front-facing plane intersects the ray at a position that is no further along the ray than positions at which the ray intersects the back-facing planes for a subset of the dimensions intersect the ray. The same principles can be applied, in alternative embodiments, to methods in which a back-facing plane is identified and then it is determined whether the identified back-facing plane intersects the ray before the front-facing planes for a subset of the dimensions intersect the ray. Examples of these alternative embodiments are described with reference to the flow chart shown in FIG. 6 and the illustrations shown in FIGS. 7a to 7j.

Figure 6:
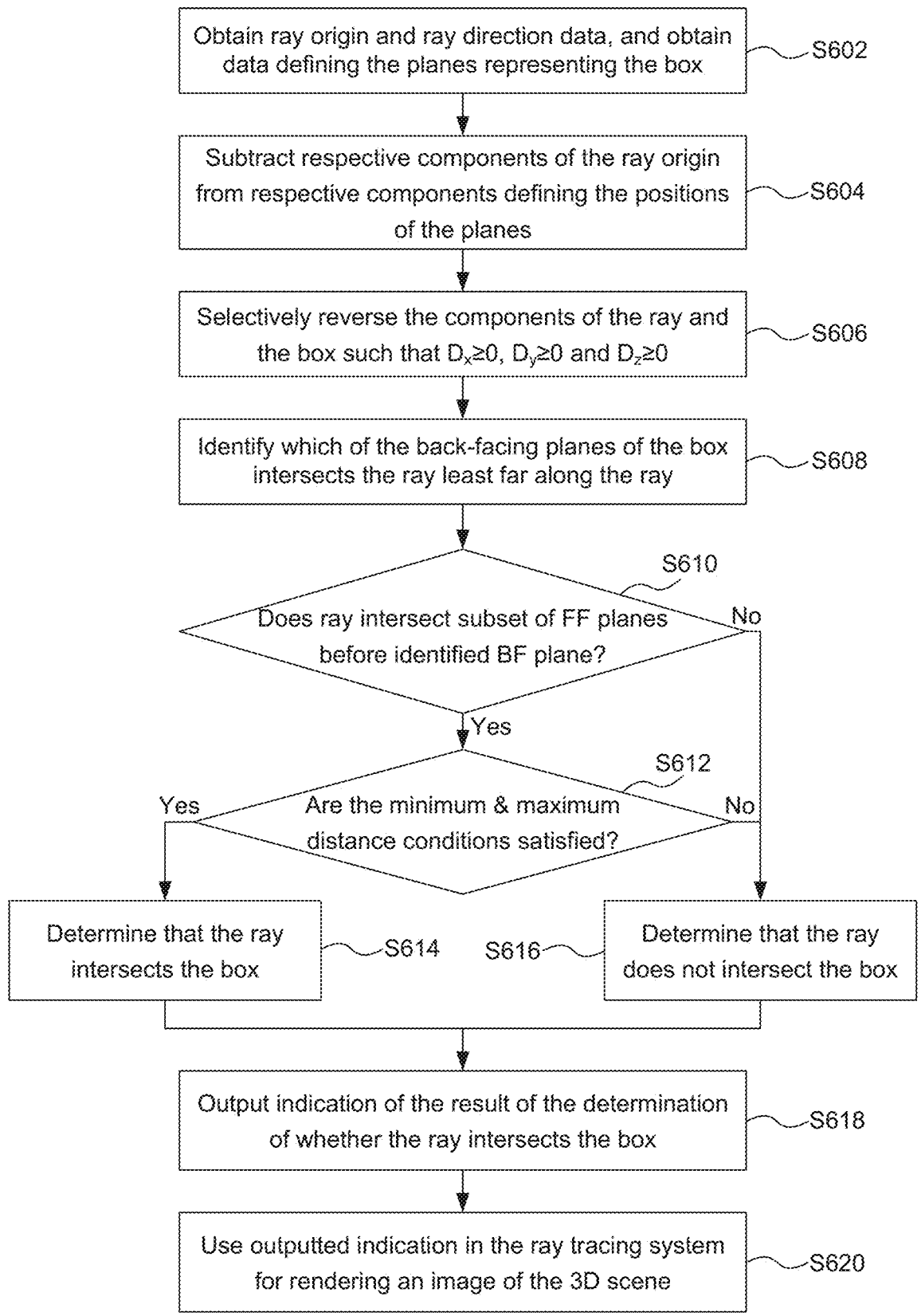
FIG. 6 is a flow chart for a second method of performing intersection testing to determine whether a ray intersects a 3D axis-aligned box according to examples described herein.

FIG. 6 is a flow chart for a method of performing intersection testing to determine whether the ray 202 intersects the 3D axis-aligned box 204. Although the description below refers to testing whether the ray 202 intersects the box 204, the same method can be applied for testing whether the ray 214 intersects the box 204.

Steps S602, S604 and S606 are the same as steps S302, S304 and S306 described above with reference to the flow chart of FIG. 3. Therefore, in step S602 data defining the ray 202 and the box 204 are obtained at the intersection testing module 108. In particular, data defining the components of the ray origin and the ray direction are obtained. The data defining the box may be data defining the positions of the planes representing the box, e.g. the component values which are constant for each of the front-facing plane and the back-facing plane in each of the three dimensions. In step S604, the intersection testing module 108 subtracts respective components of the origin of the ray from respective components defining the positions of the front-facing planes and the back-facing planes of the box. In step S606 the axes for the components of the ray and the box are selectively reversed by the intersection testing module 108 (e.g. by the ray adjustment unit 116), such that $D_x \geq 0$, $D_y \geq 0$ and $D_z \geq 0$. At the end of step S606, the intersection testing module 108 has determined the values of $x_{min}$, $y_{min}$, $z_{min}$, $x_{max}$, $y_{max}$ and $z_{max}$.

In step S608 the intersection testing module 108 (specifically the one or more box intersection testing units 112)

identifies which of the back-facing planes of the box intersects the ray least far along the ray. Two example approaches for identifying which of the back-facing planes of the box intersects the ray least far along the ray in step S608 are described in detail below.

A First Approach for Identifying Which of the Back-Facing Planes of the Box Intersects the Ray Least Far Along the Ray in Step S608

In the first approach for performing step S608 described herein, step S608 comprises: (i) performing a first back-facing test to determine which of a first back-facing plane and a second back-facing plane of the box the ray intersects least far along the ray, and (ii) performing a second back-facing test to determine which of the determined back-facing plane and a third back-facing plane of the box the ray intersects least far along the ray, thereby identifying which of the back-facing planes of the box intersects the ray least far along the ray. In this approach, two tests are performed sequentially. The second test uses the result of the first test.

Figure 7A:
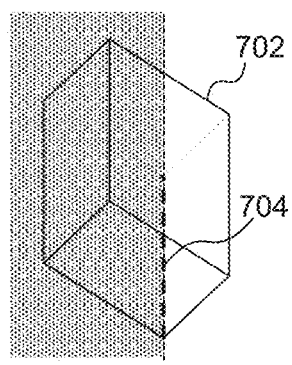
FIGS. 7a to 7j represent tests that are performed during the second method of performing intersection testing to determine whether a ray intersects a 3D axis-aligned box.
Figure 7B:
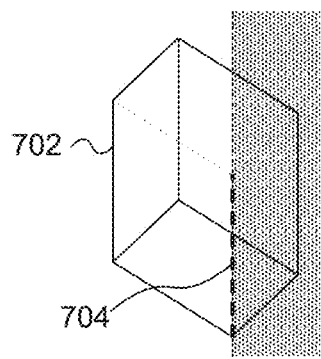

FIGS. 7a and 7b illustrate the first back-facing test to determine whether $B_iD_j>B_jD_i$. In particular, FIGS. 7a and 7b show an axis-aligned box 702 with three front-facing planes and three back-facing planes, as viewed from the viewpoint of the origin of a ray (similar to FIG. 2b and FIGS. 4a to 4j). The edge 704 defines a line (which is shown as a dashed line) which is where the back-facing planes for the $i^{th}$ and $j^{th}$ dimensions intersect. Following the first back-facing test to determine whether $B_iD_j>B_jD_i$ it is known which side of the line defined by the edge 704 the ray passes on. Therefore, this comparison can be considered to be an edge test on the edge 704. This comparison can also be considered to be a test of which of the two back-facing planes (for dimensions i and j) intersects the ray least far along the ray. The dotted region to one side of the line defined by the edge 704 represents a region which it is known that the ray does not intersect due to the determination of whether $B_iD_j>B_jD_i$. In other words, the determination of whether $B_iD_j>B_jD_i$ determines that the ray passes somewhere in the undotted region to the other side of the line defined by the edge 704. FIG. 7a shows the situation in which the ray passes to the right of the line defined by the edge 704, i.e. $B_iD_j>B_jD_i$ such that the back-facing plane for dimension j intersects the ray less far along the ray than where the back-facing plane for dimension i intersects the ray. In contrast, FIG. 7b shows the situation in which the ray passes to the left of the line defined by the edge 704, i.e. $B_iD_j<B_jD_i$ such that the back-facing plane for dimension i intersects the ray less far along the ray than where the back-facing plane for dimension j intersects the ray. If $B_iD_j=B_jD_i$ then either of the back-facing planes for dimensions i and j can be chosen. For example, if the ray intersects the line defined by the edge 704 then it can be considered to be in both the undotted regions shown in FIGS. 7a and 7b.

Figure 7C:
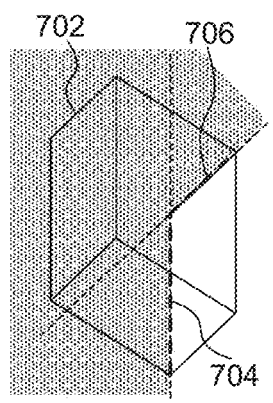
Figure 7D:
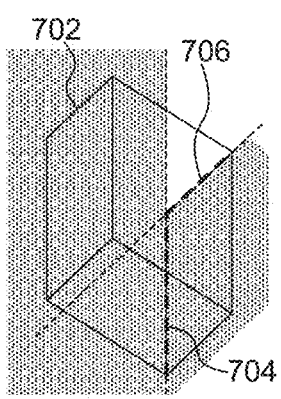

In the second back-facing test, the back-facing plane which was determined to intersect the ray least far along the ray in the first back-facing test is tested against the remaining back-facing plane to determine which of back-facing planes of the box intersects the ray least far along the ray. For example, if it was determined that the back-facing plane for dimension j intersects the ray less far along the ray than where the back-facing plane for dimension i intersects the ray (i.e. in the situation shown in FIG. 7a) then the second back-facing test comprises determining whether $B_jD_k>B_kD_j$, as illustrated in FIGS. 7c and 7d. The edge 706 defines a line (which is shown as a dashed line) which is where the back-facing planes for the $j^{th}$ and $k^{th}$ dimensions intersect. Following the second back-facing test to determine whether $B_jD_k>B_kD_j$ it is known which side of the line defined by the edge 706 the ray passes on. Therefore, this comparison can be considered to be an edge test on the edge 706. This comparison can also be considered to be a test of which of the two back-facing planes (for dimensions j and k) intersects the ray least far along the ray. FIG. 7c shows the situation in which the ray passes below the line defined by the edge 706, i.e. $B_jD_k<B_kD_j$ such that the back-facing plane for dimension j intersects the ray less far along the ray than where the back-facing plane for dimension k intersects the ray. Therefore, in the situation shown in FIG. 7c, step S608 identifies the back-facing plane for dimension j. In contrast, FIG. 7d shows the situation in which the ray passes above the line defined by the edge 706, i.e. $B_jD_k>B_kD_j$ such that the back-facing plane for dimension k intersects the ray less far along the ray than where the back-facing plane for dimension j intersects the ray. Therefore, in the situation shown in FIG. 7d, step S608 identifies the back-facing plane for dimension k. If $B_jD_k=B_kD_j$ then either of the back-facing planes for dimensions j and k can be chosen.

Figure 7E:
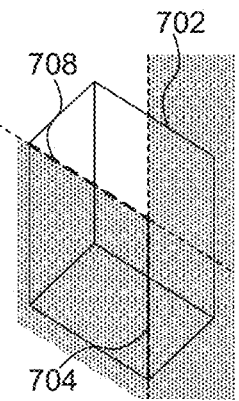
Figure 7F:
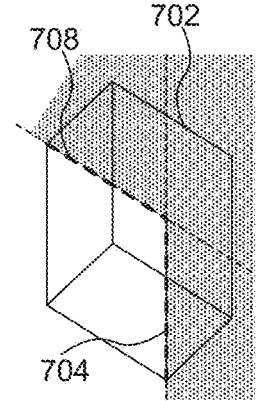
Figure 7G:
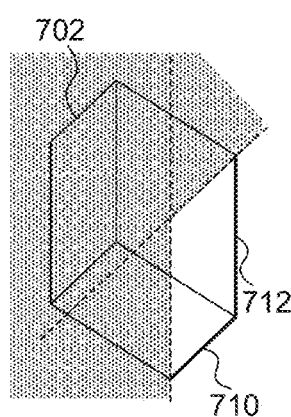

If it was determined that the back-facing plane for dimension i intersects the ray less far along the ray than where the back-facing plane for dimension j intersects the ray (i.e. in the situation shown in FIG. 7b) then the second back-facing test comprises determining whether $B_iD_k>B_kD_i$, as illustrated in FIGS. 7e and 7f. The edge 708 defines a line (which is shown as a dashed line) which is where the back-facing planes for the $i^{th}$ and $k^{th}$ dimensions intersect. Following the second back-facing test to determine whether $B_iD_k>B_kD_i$ it is known which side of the line defined by the edge 708 the ray passes on. Therefore, this comparison can be considered to be an edge test on the edge 708. This comparison can also be considered to be a test of which of the two back-facing planes (for dimensions i and k) intersects the ray least far along the ray. FIG. 7e shows the situation in which the ray passes above the line defined by the edge 708, i.e. $B_iD_k>B_kD_i$ such that the back-facing plane for dimension k intersects the ray less far along the ray than where the back-facing plane for dimension i intersects the ray. Therefore, in the situation shown in FIG. 7e, step S608 identifies the back-facing plane for dimension k. In contrast, FIG. 7f shows the situation in which the ray passes below the line defined by the edge 708, i.e. $B_iD_k<B_kD_i$ such that the back-facing plane for dimension i intersects the ray less far along the ray than where the back-facing plane for dimension k intersects the ray. Therefore, in the situation shown in FIG. 7f, step S608 identifies the back-facing plane for dimension i. If $B_iD_k=B_kD_i$ then either of the back-facing planes for dimensions i and k can be chosen.

A Second Approach for Identifying Which of the Back-Facing Planes of the Box Intersects the Ray Least Far Along the Ray in Step S608

In the second approach for performing step S608 described herein, step S608 comprises: (i) performing a first back-facing test to determine which of a first back-facing plane and a second back-facing plane of the box the ray intersects least far along the ray; (ii) performing a second back-facing test to determine which of the first back-facing plane and a third back-facing plane of the box the ray intersects least far along the ray; and (iii) performing a third back-facing test to determine which of the second back-facing plane and the third back-facing plane of the box the ray intersects least far along the ray. The results of the first, second and third back-facing tests are used to identify which of the back-facing planes of the box intersects the ray least far along the ray. In this second approach, the first, second and third back-facing tests are performed independently of each other (i.e. they do not require results from one another), and so these three tests may be performed in parallel.

This second approach can be considered to be performing three back-facing tests to test which side of each of the lines defined by the three edges 704, 706 and 708 the ray passes on. For example, the first back-facing test may determine whether $B_iD_j>B_jD_i$. If $B_iD_j>B_jD_i$ then the back-facing plane for dimension j intersects the ray less far along the ray than where the back-facing plane for dimension i intersects the ray (e.g. the ray passes on the right of the line defined by edge 704); whereas if $B_iD_j<B_jD_i$ then the back-facing plane for dimension i intersects the ray less far along the ray than where the back-facing plane for dimension j intersects the ray (e.g. the ray passes on the left of the line defined by edge 704). The second back-facing test may determine whether $B_iD_k>B_kD_i$. If $B_iD_k>B_kD_i$ then the back-facing plane for dimension k intersects the ray less far along the ray than where the back-facing plane for dimension i intersects the ray (e.g. the ray passes above the line defined by edge 708); whereas if $B_iD_k<B_kD_i$ then the back-facing plane for dimension i intersects the ray less far along the ray than where the back-facing plane for dimension k intersects the ray (e.g. the ray passes below the line defined by edge 708). The third back-facing test may determine whether $B_jD_k>B_kD_j$. If $B_jD_k>B_kD_j$ then the back-facing plane for dimension k intersects the ray less far along the ray than where the back-facing plane for dimension j intersects the ray (e.g. the ray passes above the line defined by edge 706); whereas if $B_jD_k<B_kD_j$ then the back-facing plane for dimension j intersects the ray less far along the ray than where the back-facing plane for dimension k intersects the ray (e.g. the ray passes below the line defined by edge 706). As described above, the results of the first, second and third back-facing tests can be used to identify which of the back-facing planes of the box intersects the ray least far along the ray.

In the first approach for performing step S608 described above, two back-facing tests are performed in series; whereas in the second approach for performing step S608 described above, three back-facing tests are performed, and these three tests may be performed in parallel. In some implementations, it may be considered beneficial to reduce the number of tests that need to be performed, so the first approach for performing step S608 may be used because this involves performing two back-facing tests rather than three. However, in some other implementations, it may be considered beneficial to shorten the processing pipeline (e.g. to reduce latency), so the second approach for performing step S608 may be used because the back-facing tests in step S608 can all be performed in parallel together, rather than performing the tests in series.

At the end of step S608, the intersection testing module 108 has identified which of the back-facing planes of the box the ray intersects least far along the ray (e.g. as illustrated in FIGS. 7c to 7f).

In step S610 the intersection testing module 108 (specifically the one or more box intersection testing units 112) determines whether the ray intersects the front-facing planes in a subset of the dimensions at positions that are no further along the ray than a position at which the ray intersects the identified back-facing plane. The subset of dimensions comprises the two dimensions for which the back-facing plane was not identified, but the subset of dimensions does not comprise the dimension for which the back-facing plane was identified. This is because, as described above, the inventors have realised that for each dimension, a ray will intersect the front-facing plane of an axis-aligned box for that dimension before it intersects the back-facing plane of the axis-aligned box for that dimension. This is partly because the front-facing plane and back-facing plane of an axis-aligned box for a particular dimension are parallel. So without performing any tests, the intersection testing module 108 can know that the ray 202 intersects the identified back-facing plane further along the ray than where it intersects the front-facing plane in the dimension for which the back-facing plane was identified. This realisation allows the number of tests that need to be performed to determine whether a ray intersects an axis-aligned box to be reduced. Two example approaches for determining whether the ray intersects the front-facing planes in a subset of the dimensions before it intersects the identified back-facing plane in step S610 are described in detail below.

A First Approach for Determining Whether the Ray Intersects the Front-Facing Planes in a Subset of the Dimensions at Positions that are no Further Along the Ray than a Position at Which the Ray Intersects the Identified Back-Facing Plane in Step S610

In the first approach for performing step S610 described herein, step S610 comprises: (i) performing a first mixed-facing test to determine which of the identified back-facing plane and a first front-facing plane of the box the ray intersects furthest along the ray, wherein the first front-facing plane of the box is a front-facing plane for a first dimension in the subset of dimensions; (ii) performing a second mixed-facing test to determine which of the identified back-facing plane and a second front-facing plane of the box the ray intersects furthest along the ray, wherein the second front-facing plane of the box is a front-facing plane for a second dimension in the subset of dimensions; and (iii) using the results of the first and second mixed-facing tests to determine whether the ray intersects the front-facing planes in the subset of the dimensions at positions that are no further along the ray than a position at which the ray intersects the identified back-facing plane. In this approach, the first and second mixed-facing tests do not depend upon the results of one another so they may be performed in parallel.

FIGS. 7g to 7j illustrate the tests that are performed in step S610 in different situations. For example, FIG. 7g follows on from the situation shown in FIGS. 7c in which the back-facing plane for dimension j was identified in step S608. In this case the first and second mixed-facing tests determine which side of the lines defined by the two edges 710 and 712 the ray passes on. For example, the first mixed-facing test may determine whether $F_kD_j>B_jD_k$. This test corresponds to testing which side of the line defined by the edge 710 the ray passes on. If $F_kD_j>B_jD_k$ then the front-facing plane for dimension k intersects the ray further along the ray than where the back-facing plane for dimension j intersects the ray (e.g. the ray passes below the line defined by edge 710) such that the ray will miss the box; whereas if $F_kD_j \leq B_jD_k$ then the front-facing plane for dimension k intersects the ray no further along the ray than where the back-facing plane for dimension j intersects the ray (e.g. the ray passes above the line defined by edge 710) such that the ray might intersect the box. The second mixed-facing test may determine whether $F_iD_j>B_jD_i$. This test corresponds to testing which side of the line defined by the edge 712 the ray passes on. If $F_iD_j>B_jD_i$ then the front-facing plane for dimension i intersects the ray further along the ray than where the back-facing plane for dimension j intersects the ray (e.g. the ray passes to the right of the line defined by edge 712) such that the ray will miss the box; whereas if $F_iD_j \leq B_jD_i$ then the front-facing plane for dimension i intersects the ray no further along the ray than where the back-facing plane for dimension j intersects the ray (e.g. the ray passes to the left of the line defined by edge 712) such that the ray might intersect the box. It is noted that the values of one or both of $B_jD_k$ and $B_jD_i$ may have been calculated in step S608. These values may be recalculated in step S610 or they may be saved (e.g. in registers) during step S608 so that they can be reused in step S610 without needing to recalculate them.

Figure 7H:
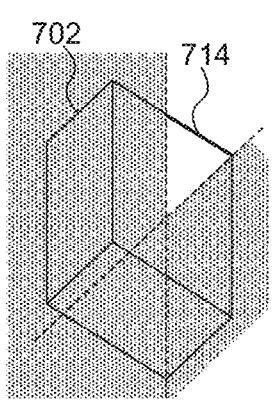
Figure 7I:
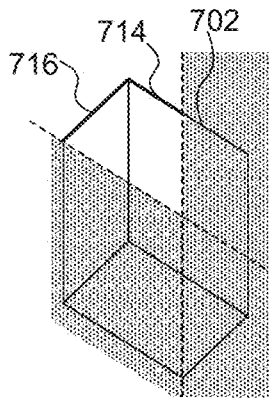

As another example, FIGS. 7h and 7i follow on from the situations shown in FIGS. 7d and 7e respectively in which the back-facing plane for dimension k was identified in step S608. In these two cases the first and second mixed-facing tests determine which side of the lines defined by the two edges 714 and 716 the ray passes on. For example, the first mixed-facing test may determine whether $F_iD_k>B_kD_i$. This test corresponds to testing which side of the line defined by the edge 714 the ray passes on. If $F_iD_k>B_kD_i$ then the front-facing plane for dimension i intersects the ray further along the ray than where the back-facing plane for dimension k intersects the ray (e.g. the ray passes above the line defined by edge 714) such that the ray will miss the box; whereas if $F_iD_k \leq B_kD_i$ then the front-facing plane for dimension i intersects the ray no further along the ray than where the back-facing plane for dimension k intersects the ray (e.g. the ray passes below the line defined by edge 714) such that the ray might intersect the box. The second mixed-facing test may determine whether $F_jD_k>B_kD_j$. This test corresponds to testing which side of the line defined by the edge 716 the ray passes on. If $F_jD_k>B_kD_j$ then the front-facing plane for dimension j intersects the ray further along the ray than where the back-facing plane for dimension k intersects the ray (e.g. the ray passes above the line defined by edge 716) such that the ray will miss the box; whereas if $F_jD_k \leq B_kD_j$ then the front-facing plane for dimension j intersects the ray no further along the ray than where the back-facing plane for dimension k intersects the ray (e.g. the ray passes below the line defined by edge 716) such that the ray might intersect the box. It is noted that the values of one or both of $B_kD_i$ and $B_kD_j$ may have been calculated in step S608. These values may be recalculated in step S610 or they may be saved (e.g. in registers) during step S608 so that they can be reused in step S610 without needing to recalculate them.

For the ray to intersect the box, the ray must intersect both of the front-facing planes for the subset of dimensions at points that are no further from the ray origin than the point at which the ray intersects the identified back-facing plane of the box. In examples described herein, a test does not need to be performed to determine whether the ray intersects the identified back-facing plane before it intersects the front-facing plane for the dimension for which the back-facing plane was identified. In some examples (e.g. as described in the preceding paragraph), both the first mixed-facing test and the second mixed-facing test must pass for a hit to be determined for the ray with respect to the box, i.e. two tests are performed to determine that the ray does not intersect the identified back-facing plane before the ray intersects respective front-facing planes for the two dimensions in the subset of dimensions. However, in some other examples, in some situations one of the mixed-facing tests is not required to be performed. For example, in the situation shown in FIG. 7h, only one mixed-facing test is required in step S610 (i.e. to test which side of the line defined by the edge 714 the ray passes on). If the box intersection testing unit(s) 112 can determine that the geometry of the box is such that only one test needs to be performed (e.g. in the situation shown in FIG. 7h but not in the situation shown in FIG. 7i) then only one test needs to be performed in step S610.

Figure 7J:
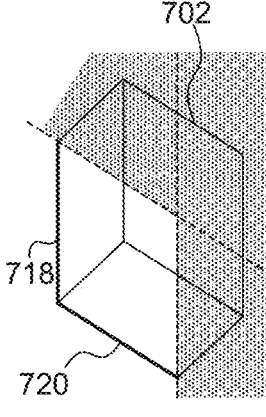

As another example, FIG. 7j follows on from the situation shown in FIG. 7f in which the back-facing plane for dimension i was identified in step S608. In this case the first and second mixed-facing tests determine which side of the lines defined by the two edges 718 and 720 the ray passes on. For example, the first mixed-facing test may determine whether $F_jD_i>B_iD_j$. This test corresponds to testing which side of the line defined by the edge 718 the ray passes on. If $F_jD_i>B_iD_j$ then the front-facing plane for dimension j intersects the ray further along the ray than where the back-facing plane for dimension i intersects the ray (e.g. the ray passes to the left of the line defined by edge 718) such that the ray will miss the box; whereas if $F_jD_i \leq B_iD_j$ then the front-facing plane for dimension j intersects the ray no further along the ray than where the back-facing plane for dimension i intersects the ray (e.g. the ray passes to the right of the line defined by edge 718) such that the ray might intersect the box. The second mixed-facing test may determine whether $F_kD_i>B_iD_k$. This test corresponds to testing which side of the line defined by the edge 720 the ray passes on. If $F_kD_i>B_iD_k$ then the front-facing plane for dimension k intersects the ray further along the ray than where the back-facing plane for dimension i intersects the ray (e.g. the ray passes below the line defined by edge 720) such that the ray will miss the box; whereas if $F_kD_i \geq B_iD_k$ then the front-facing plane for dimension k intersects the ray no further along the ray than where the back-facing plane for dimension i intersects the ray (e.g. the ray passes above the line defined by edge 720) such that the ray might intersect the box. It is noted that the values of one or both of $B_iD_j$ and $B_iD_k$ may have been calculated in step S608. These values may be recalculated in step S610 or they may be saved (e.g. in registers) during step S608 so that they can be reused in step S610 without needing to recalculate them.

A Second Approach for Determining Whether the Ray Intersects the Front-Facing Planes in a Subset of the Dimensions at Positions that are no Further Along the Ray than a Position at Which the Ray Intersects the Identified Back-Facing Plane in Step S610

In the second approach for performing step S610 described herein, step S610 comprises: (i) performing a front-facing test to determine which of a first front-facing plane and a second front-facing plane of the box the ray intersects furthest along the ray, wherein the first front-facing plane of the box is a front-facing plane for a first dimension in the subset of dimensions, and the second front-facing plane of the box is a front-facing plane for a second dimension in the subset of dimensions; (ii) performing a mixed-facing test to determine which of the identified back-facing plane and the determined front-facing plane of the box the ray intersects furthest along the ray; and (iii) using the result of the mixed-facing test to determine whether the ray intersects the front-facing planes in the subset of the dimensions at positions that are no further along the ray than a position at which the ray intersects the identified back-facing plane.

In other words, in this approach, the furthest front-facing plane for the ray is determined, and then the intersection testing module 108 determines whether the furthest front-facing plane is further along the ray than the closest back-facing plane (i.e. the identified back-facing plane). If it is, then the ray misses the box.

For example, in FIG. 7c the back-facing plane for dimension j was identified in step S608. In this case the front-facing test determines which of the front-facing planes for dimensions i and k intersects the ray furthest along the ray. The front-facing test may determine whether $F_iD_k>F_kD_i$. If $F_iD_k>F_kD_i$ then the front-facing plane for dimension i intersects the ray further along the ray than where the front-facing plane for dimension k intersects the ray; whereas if $F_iD_k<F_kD_i$ then the front-facing plane for dimension k intersects the ray further along the ray than where the front-facing plane for dimension i intersects the ray. If $F_iD_k=F_kD_i$ then either of the front-facing planes for dimensions i or k can be chosen. The mixed-facing test may determine whether $B_jD_{far}>F_{far}D_j$, where the dimension (either i or k in this case) for which the front-facing plane is determined to be furthest along the ray is denoted "far". If $B_jD_{far}<F_{far}D_j$ then the determined front-facing plane intersects the ray further along the ray than where the back-facing plane for dimension j intersects the ray, such that the ray will miss the box; whereas if $B_jD_{far}\geq F_{far}D_j$ then the determined front-facing plane intersects the ray no further along the ray than where the back-facing plane for dimension j intersects the ray. This means that the ray might intersect the box, subject to the minimum and maximum distance conditions.

In the examples shown in FIGS. 7d and 7e the back-facing plane for dimension k was identified in step S608. In these two cases the front-facing test determines which of the front-facing planes for dimensions i and j intersects the ray furthest along the ray. The front-facing test may determine whether $F_iD_j>F_jD_i$. If $F_iD_j>F_jD_i$ then the front-facing plane for dimension i intersects the ray further along the ray than where the front-facing plane for dimension j intersects the ray; whereas if $F_iD_j<F_jD_i$ then the front-facing plane for dimension j intersects the ray further along the ray than where the front-facing plane for dimension i intersects the ray. If $F_iD_j=F_jD_i$ then either of the front-facing planes for dimensions i or j can be chosen. The mixed-facing test may determine whether $B_kD_{far}>F_{far}D_k$, where the dimension (either i or j in this case) for which the front-facing plane is determined to be furthest along the ray is denoted "far". If $B_kD_{far}<F_{far}D_k$ then the determined front-facing plane intersects the ray further along the ray than where the back-facing plane for dimension k intersects the ray, such that the ray will miss the box; whereas if $B_kD_{far}\geq F_{far}D_k$ then the determined front-facing plane intersects the ray no further along the ray than where the back-facing plane for dimension k intersects the ray. This means that the ray might intersect the box, subject to the minimum and maximum distance conditions.

In the example shown in FIG. 7f the back-facing plane for dimension i was identified in step S608. In this the front-facing test determines which of the front-facing planes for dimensions j and k intersects the ray furthest along the ray. The front-facing test may determine whether $F_jD_k>F_kD_j$. If $F_jD_k>F_kD_j$ then the front-facing plane for dimension j intersects the ray further along the ray than where the front-facing plane for dimension k intersects the ray; whereas if $F_jD_k<F_kD_j$ then the front-facing plane for dimension k intersects the ray further along the ray than where the front-facing plane for dimension j intersects the ray. If $F_jD_k=F_kD_j$ then either of the front-facing planes for dimensions j or k can be chosen. The mixed-facing test may determine whether $B_iD_{far}>F_{far}D_i$, where the dimension (either j or k in this case) for which the front-facing plane is determined to be furthest along the ray is denoted "far". If $B_iD_{far}<F_{far}D_i$ then the determined front-facing plane intersects the ray further along the ray than where the back-facing plane for dimension i intersects the ray, such that the ray will miss the box; whereas if $B_iD_{far}\geq F_{far}D_i$ then the determined front-facing plane intersects the ray no further along the ray than where the back-facing plane for dimension i intersects the ray. This means that the ray might intersect the box, subject to the minimum and maximum distance conditions.

Steps S608 and S610 do not involve computing intersection distances to any of the planes of the box. Instead, steps S608 and S610 involve performing tests (e.g. front-facing tests, back-facing tests and mixed-facing tests) to determine, for a pair of planes, which of the planes intersects the ray further along the ray. This is achieved in examples described herein by comparing the values of cross-multiplications, which does not involve computing intersection distances to the planes of the box. Intersection distances do not need to be computed for the box intersection tests performed by the box intersection testing unit(s) 112.

As described above, in some examples, one or more intermediate results which are determined in step S608 may be stored, and then in step S610 the stored one or more intermediate results can be read for use in determining whether the ray intersects the front-facing planes in a subset of the dimensions before it intersects the identified back-facing plane in step S610.

Returning to FIG. 6, at the end of step S610 the intersection testing module has determined whether the ray would intersect the axis-aligned box if the ray were infinitely long. This determination is used to determine whether the ray intersects the axis-aligned box. It is noted that the method determines whether the ray intersects the box without performing a test to determine whether the ray intersects the front-facing plane in the dimension for which the back-facing plane was identified before it intersects the identified back-facing plane. In this way, the method described herein avoids performing some of the tests by making some tests conditional on previous results. Furthermore, it is noted again that intersection distances are not computed directly for any of the planes of the box.

In examples described above, step S610 includes at most two tests (and in some situations it is possible to just perform one test in step S610, e.g. in the situation shown in FIG. 7h). Step S608 includes two or three tests depending on which approach is taken. Therefore, if the first approach to step S608 is used (in which step S608 involves performing two tests), the total number of tests is at most four, and may in some situations, just be three, e.g. in the situation shown in FIG. 7h). Furthermore, if the second approach to step S608 is used (in which step S608 involves performing three tests), the total number of tests is at most five, and may in some situations, just be four, e.g. in the situation shown in FIG. 7h).

If it was determined in step S610 that the ray does not intersect the front-facing planes in the subset of the dimensions at positions that are no further along the ray than a position at which the ray intersects the identified back-facing plane then it is known that the ray misses the box, and the method passes from step S610 to step S616 in which it is determined that the ray misses the box (i.e. it does not intersect the box). If it is determined in step S610 that the ray does intersect the front-facing planes in the subset of the dimensions at positions that are no further along the ray than a position at which the ray intersects the identified back-facing plane then the method passes to step S612.

Steps S612 to S620 shown in FIG. 6 correspond with steps S312 to S320 described above with reference to FIG. 3. In particular, in step S612 the intersection testing module 108 (specifically the box intersection testing unit(s) 112) determines whether a minimum distance condition and a maximum distance condition are satisfied. The minimum distance condition is satisfied if a minimum valid distance of the ray from the ray origin is less than or equal to a maximum distance from the ray origin to any intersection of the ray with a point within the box. In other words, the minimum distance condition is satisfied if the start of the ray (defined by a value of $t_{min}$) is not beyond the box when travelling along the direction vector of the ray. In step S608 the back-facing plane of the box which intersects with the ray least far along the ray has been identified, and this identification can be used to simplify the process of determining whether the minimum distance satisfied. For example, if the back-facing plane for dimension i is identified in step S608, where i could be any of the x, y or z dimensions, the test for determining whether a minimum distance condition is satisfied comprises determining whether $B_i \geq D_i t_{min}$. The other two dimensions can be ignored because it is only the point at which the ray intersects the identified back-facing plane that matters for the minimum distance condition. As described above, $t_{min}$ is a parameter which defines the minimum valid distance of the ray from the ray origin. If $B_i \geq D_i t_{min}$ then the minimum distance condition is satisfied; whereas if $B_i < D_i t_{min}$ then the minimum distance condition is not satisfied. In the more general notation used above, $B_i$ can be denoted $P_{1,i}$. As mentioned above, in some examples, if any of the back-facing planes of the box have negative constant values, i.e. if $B_i<0$, $B_j<0$ or $B_k<0$ (i.e. if any of $x_{max}$, $y_{max}$ or $z_{max}$ are negative), then the box is behind the ray, and thus in these examples the intersection testing module 108 can determine that the ray misses the box. This determination may be performed at any point after step S606, and if this determination determines that the ray misses the box because the box is behind the ray (which may be referred to as a "pantomime box") then the method may jump straight to step S616 without performing some or all of the tests described herein in relation to steps S608, S610 and S612.

The maximum distance condition is satisfied if a maximum valid distance of the ray from the ray origin is greater than or equal to a minimum distance from the ray origin to any intersection of the ray direction vector with a point within the box. In other words, the maximum distance condition is satisfied if the end of the ray (defined by a value of $t_{max}$) is not before the box when travelling along the direction vector of the ray. For example, the determination of whether a maximum distance condition is satisfied may comprise determining whether $F_i \leq D_i t_{max}$, $F_j \leq D_j t_{max}$ and $F_k \leq D_k t_{max}$. As described above, $t_{max}$ is a parameter which defines the maximum valid distance of the ray from the ray origin. If all three of $F_i \leq D_i t_{max}$, $F_j \leq D_j t_{max}$ and $F_k \leq D_k t_{max}$ are true then the maximum distance condition is satisfied; whereas if any one of $F_i > D_i t_{max}$, $F_j > D_j t_{max}$ and $F_k > D_k t_{max}$ is true then the maximum distance condition is not satisfied. In the more general notation used above, $F_i$, $F_j$ and $F_k$ can be denoted as $P_{0,i}$, $P_{0,j}$ and $P_{0,k}$ respectively.

The tests performed in step S612 for determining whether a maximum distance condition is satisfied and for determining whether a minimum distance condition is satisfied may be performed in parallel with the tests performed in step S610 for determining whether the ray intersects the front-facing planes in a subset of the dimensions before it intersects the identified back-facing plane. This is because the tests performed in step S612 do not depend upon the results of the tests performed in step S610. Performing the tests in parallel may be particularly beneficial in implementations in which the box intersection testing unit(s) 112 are implemented in hardware, (e.g. in fixed function circuitry) the three comparisons may be performed independently, e.g. in parallel. In other examples (e.g. in which the box intersection testing unit(s) 112 are implemented in software, e.g. modules of computer code executed on a processing unit) the tests performed in steps S610 and S612 may be performed sequentially wherein a second of the tests is performed only if a first test does not determine a miss for the ray with respect to the box, and a third of the tests is performed only if a first test does not determine a miss for the ray with respect to the box, and so on. This sequential approach allows a miss to be determined without necessarily performing all of the tests (if earlier tests in the sequence have determined a miss for the ray with respect to the box).

The determinations in step S612 of whether the minimum distance condition and maximum distance condition are satisfied are used to determine whether the ray intersects the axis-aligned box. If one or both of the minimum distance condition and the maximum distance condition are not satisfied then the method passes from step S612 to step S616 in which the intersection testing module 108 (specifically the box intersection testing unit(s) 112) determines that the ray does not intersect the box. However, if both of the minimum distance condition and the maximum distance condition are satisfied then the method passes from step S612 to step S614 in which the intersection testing module 108 (specifically the box intersection testing unit(s) 112) determines that the ray does intersect the box. It is noted that in order to arrive at step S614, i.e. in order for the intersection testing module to determine that the ray intersects the axis-aligned box, it will have determined that the ray intersects the front-facing planes at positions that are no further along the ray than a position at which the ray intersects the identified back-facing plane (in step S610), and it will have determined that maximum distance and minimum distance conditions satisfied (in step S612).

Following steps S614 and/or S616 the method passes to step S618 in which the intersection testing module 108 outputs an indication of the result of the determination of whether the ray intersects the box. This indication could be a binary indication (e.g. a one-bit flag) to indicate either a 'hit' or a 'miss' of the ray in respect of the box. In other examples, the indications could have different forms. In step S620, the outputted indication is used in the ray tracing system 100 (e.g. by the processing logic 110) for rendering an image of a 3D scene, e.g. in the same way as described above in relation to step S320.

Figure 8:
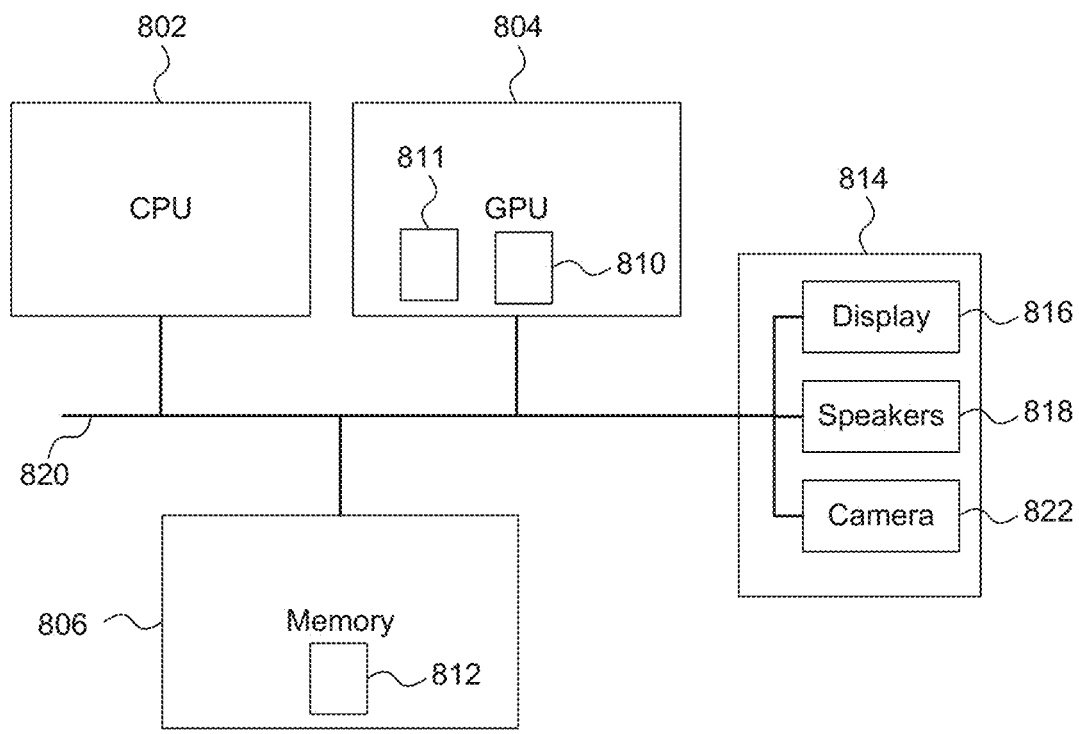
FIG. 8 shows a computer system in which a ray tracing system is implemented.

FIG. 8 shows a computer system in which the ray tracing systems described herein may be implemented. The computer system comprises a CPU 802, a GPU 804, a memory 806 and other devices 814, such as a display 816, speakers 818 and a camera 822. A ray tracing unit 810 (corresponding to ray tracing unit 102) is implemented on the GPU 804, as well as a Neural Network Accelerator (NNA) 811. In other examples, the ray tracing unit 810 may be implemented on the CPU 802 or within the NNA 811 or as a separate processing unit in the computer system. The components of the computer system can communicate with each other via a communications bus 820. A store 812 (corresponding to memory 104) is implemented as part of the memory 806.

The ray tracing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing system at any point and may merely represent logical values which conveniently describe the processing performed by the ray tracing system between its input and output.

The ray tracing units, and specifically the intersection testing modules described herein may be embodied in hardware on an integrated circuit. The intersection testing modules described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture an intersection testing module configured to perform any of the methods described herein, or to manufacture an intersection testing module comprising any apparatus described herein. An integrated circuit definition dataset may be, for example, an integrated circuit description.

Therefore, there may be provided a method of manufacturing, at an integrated circuit manufacturing system, an intersection testing module as described herein. Furthermore, there may be provided an integrated circuit definition dataset that, when processed in an integrated circuit manufacturing system, causes the method of manufacturing an intersection testing module to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an intersection testing module will now be described with respect to FIG. 9.

Figure 9:
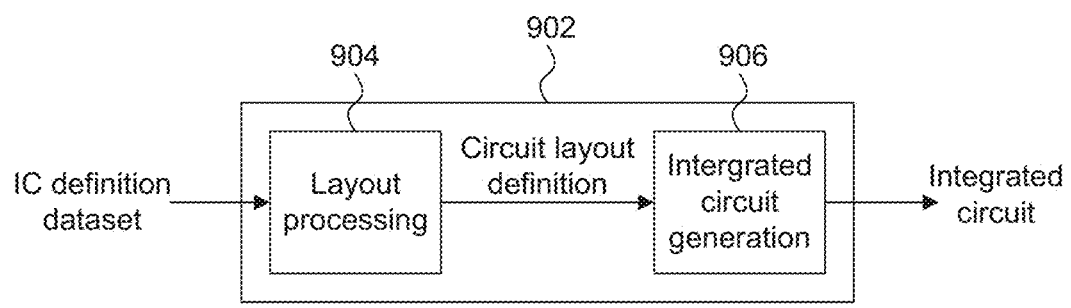
FIG. 9 shows an integrated circuit manufacturing system for generating an integrated circuit embodying a ray tracing system.

FIG. 9 shows an example of an integrated circuit (IC) manufacturing system 902 which is configured to manufacture an intersection testing module as described in any of the examples herein. In particular, the IC manufacturing system 902 comprises a layout processing system 904 and an integrated circuit generation system 906. The IC manufacturing system 902 is configured to receive an IC definition dataset (e.g. defining an intersection testing module as described in any of the examples herein), process the IC definition dataset, and generate an IC according to the IC definition dataset (e.g. which embodies an intersection testing module as described in any of the examples herein). The processing of the IC definition dataset configures the IC manufacturing system 902 to manufacture an integrated circuit embodying an intersection testing module as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 906. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an intersection testing module without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:
    identifying which of the front-facing planes of the box intersects the ray at a position that is furthest along a direction of the ray;
    determining whether the position at which the ray intersects the identified front-facing plane is no further along the ray than positions at which the ray intersects the back-facing planes in a subset of the dimensions, wherein the subset of dimensions comprises the two dimensions for which the front-facing plane was not identified, but wherein the subset of dimensions does not comprise the dimension for which the front-facing plane was identified; and
    determining whether the ray intersects the axis-aligned box in dependence on the determination of whether the position at which the ray intersects the identified front-facing plane is no further along the ray than positions at which the ray intersects the back-facing planes in the subset of the dimensions,
    wherein the method determines whether the ray intersects the box without performing a test to determine whether the position at which the ray intersects the identified front-facing plane is no further along the ray than a position at which the ray intersects the back-facing plane in the dimension for which the front-facing plane was identified.

2. The method of claim 1 wherein said steps of identifying which of the front-facing planes of the box intersects the ray at a position that is furthest along a direction of the ray and determining whether the position at which the ray intersects the identified front-facing plane is no further along the ray than positions at which the ray intersects the back-facing planes in the subset of the dimensions, are performed without computing intersection distances to any of the planes of the box.

3. The method of claim 1 wherein said identifying which of the front-facing planes of the box intersects the ray at a position that is furthest along the direction of the ray comprises:

performing a first front-facing test to determine which of a first front-facing plane and a second front-facing plane of the box the ray intersects furthest along the ray; and performing a second front-facing test to determine which of the determined front-facing plane and a third front-facing plane of the box the ray intersects furthest along the ray, thereby identifying which of the front-facing planes of the box intersects the ray furthest along the ray.

4. The method of claim 1 wherein said identifying which of the front-facing planes of the box intersects the ray at a position that is furthest along the direction of the ray comprises:

performing a first front-facing test to determine which of a first front-facing plane and a second front-facing plane of the box intersects the ray intersects at a position that is furthest along the ray;

performing a second front-facing test to determine which of the first front-facing plane and a third front-facing plane of the box intersects the ray at a position that is furthest along the direction of the ray;

performing a third front-facing test to determine which of the second front-facing plane and the third front-facing plane of the box intersects the ray at a position that is furthest along the direction of the ray; and using the results of the first, second and third front-facing tests to identify which of the front-facing planes of the box intersects the ray at a position that is furthest along the direction of the ray.

5. The method of claim 1 wherein said determining whether the position at which the ray intersects the identified front-facing plane is no further along the ray than positions at which the ray intersects the back-facing planes in the subset of the dimensions comprises:

performing a first mixed-facing test to determine which of the identified front-facing plane and a first back-facing plane of the box intersects the ray at a position that is furthest along the direction of the ray, wherein the first back-facing plane of the box is a back-facing plane for a first dimension in the subset of dimensions;

performing a second mixed-facing test to determine which of the identified front-facing plane and a second back-facing plane of the box intersects the ray at a position that is furthest along the direction of the ray, wherein the second back-facing plane of the box is a back-facing plane for a second dimension in the subset of dimensions; and using the results of the first and second mixed-facing tests to determine whether the position at which the ray intersects the identified front-facing plane is no further along the ray than positions at which the ray intersects the back-facing planes in the subset of the dimensions.

6. The method of claim 1 wherein said determining whether the position at which the ray intersects the identified front-facing plane is no further along the ray than positions at which the ray intersects the back-facing planes in the subset of the dimensions comprises:

performing a back-facing test to determine which of a first back-facing plane and a second back-facing plane of the box intersects the ray at a position that is the least far along the direction of the ray, wherein the first back-facing plane of the box is a back-facing plane for a first dimension in the subset of dimensions, and the second back-facing plane of the box is a back-facing plane for a second dimension in the subset of dimensions;

performing a mixed-facing test to determine which of the identified front-facing plane and the determined back-facing plane of the box intersects the ray at a position that is furthest along the direction of the ray; and using the result of the mixed-facing test to determine whether the position at which the ray intersects the identified front-facing plane is no further along the ray than positions at which the ray intersects the back-facing planes in the subset of the dimensions.

7. The method of claim 1 further comprising performing a front-facing test, a back-facing test or a mixed-facing test to determine which of a first plane and a second plane of the box intersects the ray at a position that is furthest along the direction of the ray, comprising: comparing $P_{m,i}D_j$; and $P_{n,j}D_i$, wherein $P_{m,i}$ is a constant component value of the first plane in the $i^{th}$ dimension, wherein $P_{n,j}$ is a constant component value of the second plane in the $j^{th}$ dimension, wherein $D_i$ and $D_j$ are components of a direction vector of the ray in the $i^{th}$ dimension and $j^{th}$ dimension respectively, wherein either:

in response to determining that $P_{m,i}D_j > P_{n,j}D_i$, determining that the ray intersects with the first plane further along the ray than where the ray intersects with the second plane; or in response to determining that $P_{m,i}D_j < P_{n,j}D_i$, determining that the ray intersects with the second plane further along the ray than where the ray intersects with the first plane, wherein the first plane is either: (i) the front-facing plane for dimension i and has a component value of $P_{0,i}$ for the $i^{th}$ dimension, or (ii) the back-facing plane for dimension i and has a component value of $P_{1,i}$ for the $i^{th}$ dimension, and wherein the second plane is either: (i) the front-facing plane for dimension j and has a component value of $P_{0,j}$ for the $j^{th}$ dimension, or (ii) the back-facing plane for dimension j and has a component value of $P_{1,j}$ for the $j^{th}$ dimension.

8. The method of claim 1 further comprising:

storing one or more intermediate results which are determined in said identifying which of the front-facing planes of the box intersects the ray at a position that is furthest along the direction of the ray; and reading the stored one or more intermediate results for use in said determining whether the position at which the ray intersects the identified front-facing plane is no further along the ray than positions at which the ray intersects the back-facing planes in the subset of the dimensions.

9. The method of claim 1 further comprising determining whether a maximum distance condition is satisfied, wherein the maximum distance condition is satisfied if a maximum valid distance of the ray from the ray origin is greater than or equal to a minimum distance from the ray origin to any intersection of the ray with a point within the box, wherein said determining whether the ray intersects the axis-aligned box further comprises using the determination of whether the maximum distance condition is satisfied.

10. The method of claim 1 further comprising determining whether a minimum distance condition is satisfied, wherein the minimum distance condition is satisfied if a minimum valid distance of the ray from the ray origin is less than or equal to a maximum distance from the ray origin to any intersection of the ray with a point within the box, wherein said determining whether the ray intersects the axis-aligned box further comprises using the determination of whether the minimum distance condition is satisfied.

11. The method of claim 10 further comprising determining whether a maximum distance condition is satisfied, wherein the maximum distance condition is satisfied if a maximum valid distance of the ray from the ray origin is greater than or equal to a minimum distance from the ray origin to any intersection of the ray with a point within the box,
wherein said determining whether the ray intersects the axis-aligned box further comprises using the determination of whether the maximum distance condition is satisfied, and
wherein said determining whether a maximum distance condition is satisfied and said determining whether a minimum distance condition is satisfied are performed in parallel with said determining whether the position at which the ray intersects the identified front-facing plane is no further along the ray than positions at which the ray intersects the back-facing planes in the subset of the dimensions.

12. The method of claim 1 further comprising selectively reversing the axes for the components of the ray and the axis-aligned box, such that $D_i \geq 0$, $D_j \geq 0$ and $D_k \geq 0$, before identifying which of the front-facing planes of the box intersects the ray at a position that is furthest along the direction of the ray, wherein $D_i$, $D_j$, and $D_k$ are the components of a direction vector of the ray in the $i^{th}$, $j^{th}$ and $k^{th}$ dimensions respectively.

13. The method of claim 1 wherein the determination of whether the ray intersects the axis-aligned box is performed conservatively by rounding values determined for front-facing planes towards $-\infty$ and rounding values determined for back-facing planes towards $+\infty$, such that errors introduced by rounding in the determination process cannot cause a determination that the ray does not intersect the axis-aligned box if a perfectly accurate determination would have determined that the ray does intersect the axis-aligned box.

14. A method of determining, in a ray tracing system, whether a ray intersects a three-dimensional axis-aligned box, wherein the box represents a volume defined by a front-facing plane and a back-facing plane for each dimension of the three-dimensional axis-aligned box, the method comprising:
identifying which of the back-facing planes of the box intersects the ray at a position that is the least far along a direction of the ray;
determining whether the ray intersects the front-facing planes in a subset of the dimensions at positions that are no further along the ray than a position at which the ray intersects the identified back-facing plane, wherein the subset of dimensions comprises the two dimensions for which the back-facing plane was not identified, but wherein the subset of dimensions does not comprise the dimension for which the back-facing plane was identified; and
determining whether the ray intersects the axis-aligned box using the determination of whether the ray intersects the front-facing planes in the subset of the dimensions at positions that are no further along the ray than a position at which the ray intersects the identified back-facing plane,
wherein the method determines whether the ray intersects the box without performing a test to determine whether the ray intersects the front-facing plane in the dimension for which the back-facing plane was identified at a position that is no further along the ray than a position at which the ray intersects the identified back-facing plane.

15. The method of claim 14 wherein said identifying which of the back-facing planes of the box intersects the ray at a position that is the least far along the direction of the ray comprises:
performing a first back-facing test to determine which of a first back-facing plane and a second back-facing plane of the box intersects the ray intersects at a position that is the least far along the direction of the ray; and
performing a second back-facing test to determine which of the determined back-facing plane and a third back-facing plane of the box intersects the ray at a position that is the least far along the direction of the ray, thereby identifying which of the back-facing planes of the box intersects the ray at a position that is the least far along the direction of the ray.

16. The method of claim 14 wherein said identifying which of the back-facing planes of the box intersects the ray at a position that is the least far along the direction of the ray comprises:
performing a first back-facing test to determine which of a first back-facing plane and a second back-facing plane of the box intersects the ray at a position that is the least far along the direction of the ray;
performing a second back-facing test to determine which of the first back-facing plane and a third back-facing plane of the box intersects the ray at a position that is the least far along the direction of the ray;
performing a third back-facing test to determine which of the second back-facing plane and the third back-facing plane of the box intersects the ray at a position that is the least far along the direction of the ray; and
using the results of the first, second and third back-facing tests to identify which of the back-facing planes of the box intersects the ray as a position that the least far along the direction of the ray.

17. The method of claim 14 wherein said determining whether the ray intersects the front-facing planes in the subset of the dimensions at positions that are no further along the ray than a position at which the ray intersects the identified back-facing plane comprises:
performing a first mixed-facing test to determine which of the identified back-facing plane and a first front-facing plane of the box intersects the ray at a position that is furthest along the direction of the ray, wherein the first front-facing plane of the box is a front-facing plane for a first dimension in the subset of dimensions;
performing a second mixed-facing test to determine which of the identified back-facing plane and a second front-facing plane of the box intersects the ray at a position that is furthest along the direction of the ray, wherein the second front-facing plane of the box is a front-facing plane for a second dimension in the subset of dimensions; and
using the results of the first and second mixed-facing tests to determine whether the ray intersects the front-facing planes in the subset of the dimensions at positions that are no further along the ray than a position at which the ray intersects the identified back-facing plane.

18. The method of claim 14 wherein said determining whether the ray intersects the front-facing planes in the subset of the dimensions at positions that are no further along the ray than a position at which the ray intersects the identified back-facing plane comprises:
- performing a front-facing test to determine which of a first front-facing plane and a second front-facing plane of the box intersects the ray at a position that is furthest along the direction of the ray, wherein the first front-facing plane of the box is a front-facing plane for a first dimension in the subset of dimensions, and the second front-facing plane of the box is a front-facing plane for a second dimension in the subset of dimensions;
- performing a mixed-facing test to determine which of the identified back-facing plane and the determined front-facing plane of the box intersects the ray at a position that is furthest along the direction of the ray; and
- using the result of the mixed-facing test to determine whether the ray intersects the front-facing planes in the subset of the dimensions at positions that are no further along the ray than a position at which the ray intersects the identified back-facing plane.

19. An intersection testing module implemented in fixed function circuitry, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:
- identify which of the front-facing planes of the box intersects the ray at a position that is furthest along a direction of the ray;
- determine whether the position at which the ray intersects the identified front- facing plane is no further along the ray than positions at which the ray intersects the back-facing planes in a subset of the dimensions, wherein the subset of dimensions comprises the two dimensions for which the front-facing plane was not identified, but wherein the subset of dimensions does not comprise the dimension for which the front-facing plane was identified; and
- determine whether the ray intersects the axis-aligned box using the determination of whether the position at which the ray intersects the identified front-facing plane is no further along the ray than positions at which the ray intersects the back-facing planes in the subset of the dimensions, wherein the intersection testing module is configured to determine whether the ray intersects the box without performing a test to determine whether the position at which the ray intersects the identified front-facing plane is no further along the ray than a position at which the ray intersects the back-facing plane in the dimension for which the front-facing plane was identified.

20. An intersection testing module implemented in fixed function circuitry, for use in a ray tracing system, configured to determine whether a ray intersects a three-dimensional axis-aligned box, wherein the box represents a volume defined by a front-facing plane and a back-facing plane for each dimension of the three-dimensional axis-aligned box, the intersection testing module being configured to:
- identify which of the back-facing planes of the box intersects the ray at a position that is the least far along a direction of the ray;
- determine whether the ray intersects the front-facing planes in a subset of the dimensions at positions that are no further along the ray than a position at which the ray intersects the identified back-facing plane, wherein the subset of dimensions comprises the two dimensions for which the back-facing plane was not identified, but wherein the subset of dimensions does not comprise the dimension for which the back-facing plane was identified; and
- determine whether the ray intersects the axis-aligned box using the determination of whether the ray intersects the front-facing planes in the subset of the dimensions at positions that are no further along the ray than the position at which the ray intersects the identified back-facing plane, wherein the intersection testing module is configured to determine whether the ray intersects the box without performing a test to determine whether the ray intersects the front-facing plane in the dimension for which the back-facing plane was identified at a position that is no further along the ray than a position at which the ray intersects the identified back-facing plane.

* * * * *